US009322976B2

(12) United States Patent
Sugiura

(10) Patent No.: US 9,322,976 B2
(45) Date of Patent: Apr. 26, 2016

(54) LIGHTING DEVICE, DISPLAY DEVICE AND TELEVISION DEVICE

(71) Applicant: Sharp Kabushiki Kaisha, Osaka-shi, Osaka (JP)

(72) Inventor: Yasutaka Sugiura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/376,158

(22) PCT Filed: Feb. 8, 2013

(86) PCT No.: PCT/JP2013/053020
§ 371 (c)(1),
(2) Date: Aug. 1, 2014

(87) PCT Pub. No.: WO2013/121998
PCT Pub. Date: Aug. 22, 2013

(65) Prior Publication Data
US 2014/0375897 A1 Dec. 25, 2014

(30) Foreign Application Priority Data
Feb. 17, 2012 (JP) ................................. 2012-032897

(51) Int. Cl.
*G02B 6/00* (2006.01)
*F21V 8/00* (2006.01)
(52) U.S. Cl.
CPC ............ *G02B 6/0031* (2013.01); *G02B 6/0061* (2013.01); *G02B 6/0068* (2013.01); *G02B 6/0036* (2013.01); *G02B 6/0073* (2013.01); *G02B 6/0085* (2013.01)
(58) Field of Classification Search
CPC .. G02B 6/0083; G02B 6/0073; G02B 6/0066; G02B 6/004; G02B 6/0055
See application file for complete search history.

(56) References Cited

U.S. PATENT DOCUMENTS

| 8,284,348 | B2 | 10/2012 | Kobayashi et al. | |
|---|---|---|---|---|
| 2004/0017688 | A1* | 1/2004 | Liu | G02B 6/0021 362/555 |
| 2007/0153548 | A1* | 7/2007 | Hamada | G02B 6/0036 362/615 |
| 2010/0020268 | A1* | 1/2010 | Kobayashi | G02F 1/133603 349/65 |
| 2010/0214331 | A1* | 8/2010 | Pyun | G02B 6/0068 345/697 |
| 2011/0141697 | A1* | 6/2011 | Fujii | G02F 1/133308 361/707 |

FOREIGN PATENT DOCUMENTS

| JP | 2010-032731 A | 2/2010 |
|---|---|---|
| JP | 2010-282911 A | 12/2010 |

OTHER PUBLICATIONS

Official Communication issued in International Patent Application No. PCT/JP2013/053020, mailed on Mar. 26, 2013.

* cited by examiner

*Primary Examiner* — Julie Bannan
(74) *Attorney, Agent, or Firm* — Keating & Bennett, LLP

(57) ABSTRACT

A backlight 12 includes a first LED board 18A, a second LED board 18B 18B, a light guide plate 19, a first LED drive circuit 26a, a second LED drive circuit 26b, and light reflection portions 28. The second LED board 18B is arranged in a high temperature area in which a temperature tends to become higher. The light guide plate 19 includes a pair of end surfaces opposite the first LED board 18A and the second LED board 18B, respectively, and through which rays of light from the first LED board 18A and the second LED board 18B enter, and a plate surface through which rays of light exit on a light exiting side. The first LED drive circuit 26a and the second LED drive circuit 26b are configured to supply a smaller current to the second LED board 18B than the current supplied to the first LED board 18A. The light reflection portions 28 are arranged such that an area distribution in a plane of the plate surface of the light guide plate 19 increases as a distance from one of the first LED board 18A and the second LED board 18B increases and takes the maximum value at a point closer to the second LED board 18B.

12 Claims, 24 Drawing Sheets

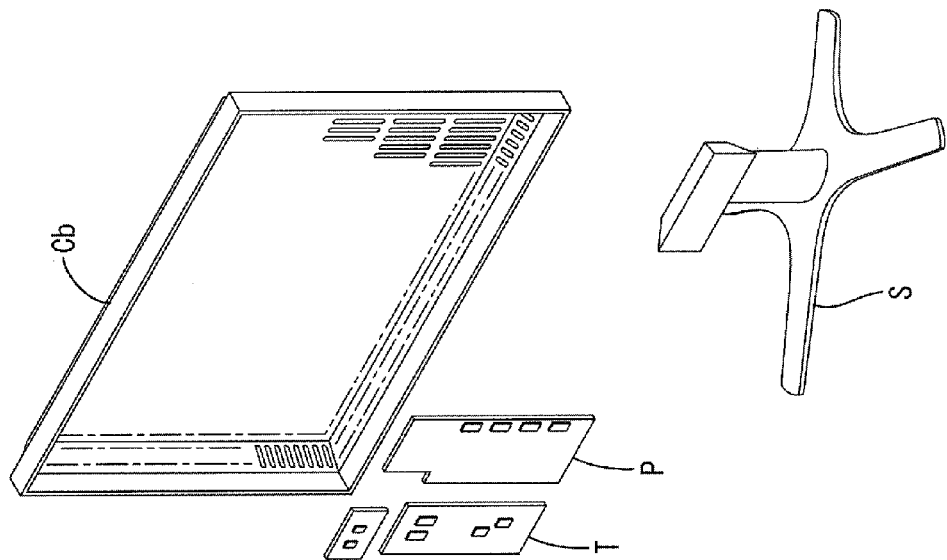
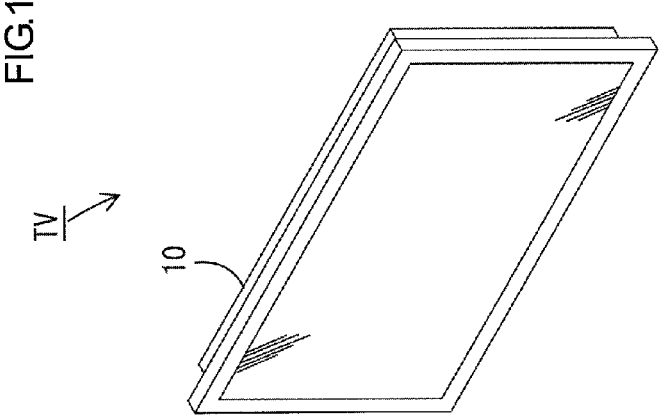
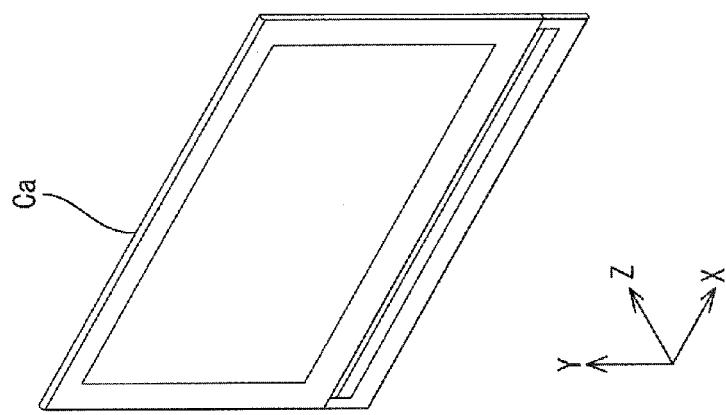
FIG.1

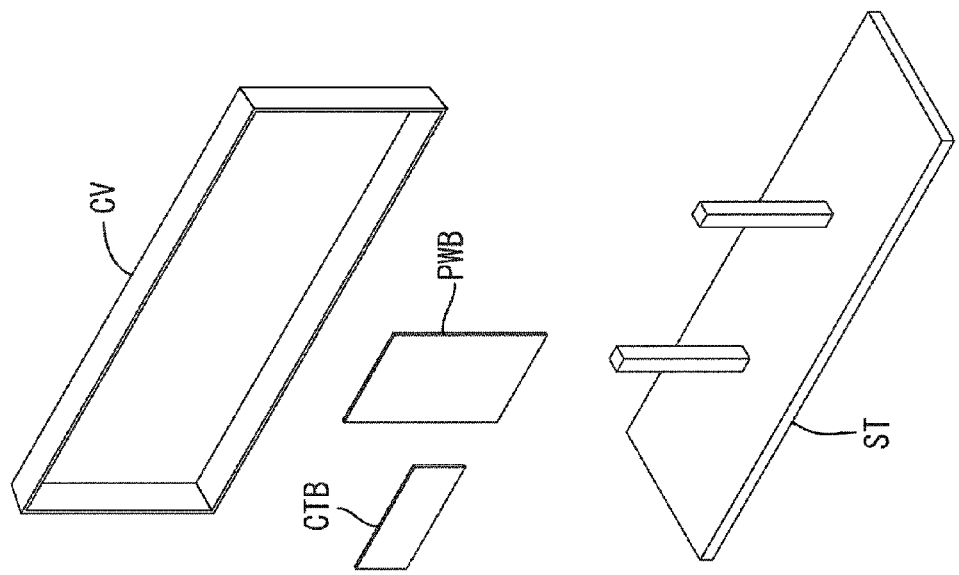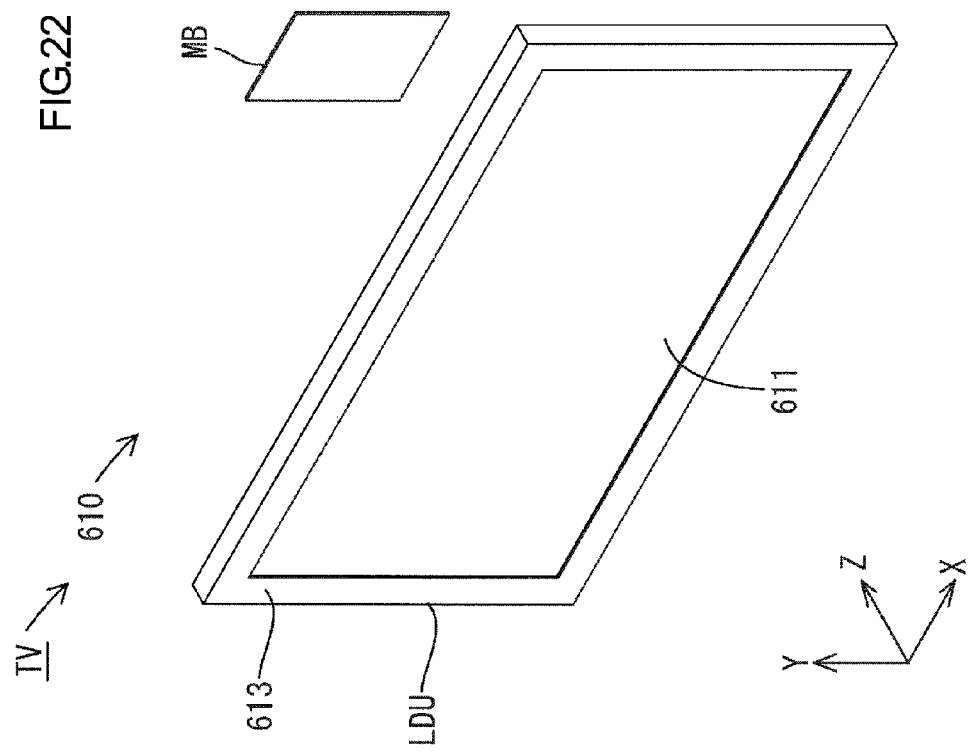
FIG.22

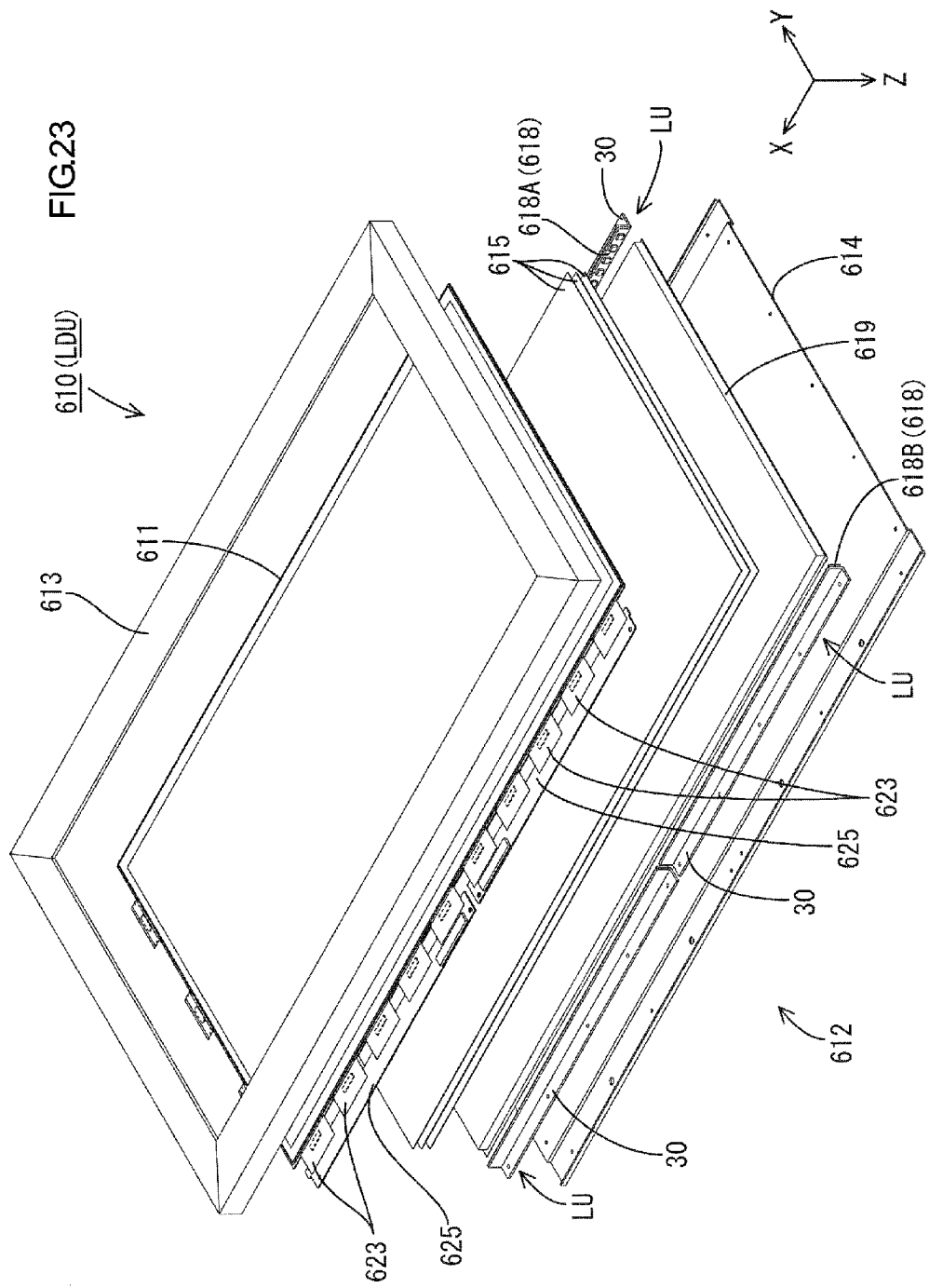

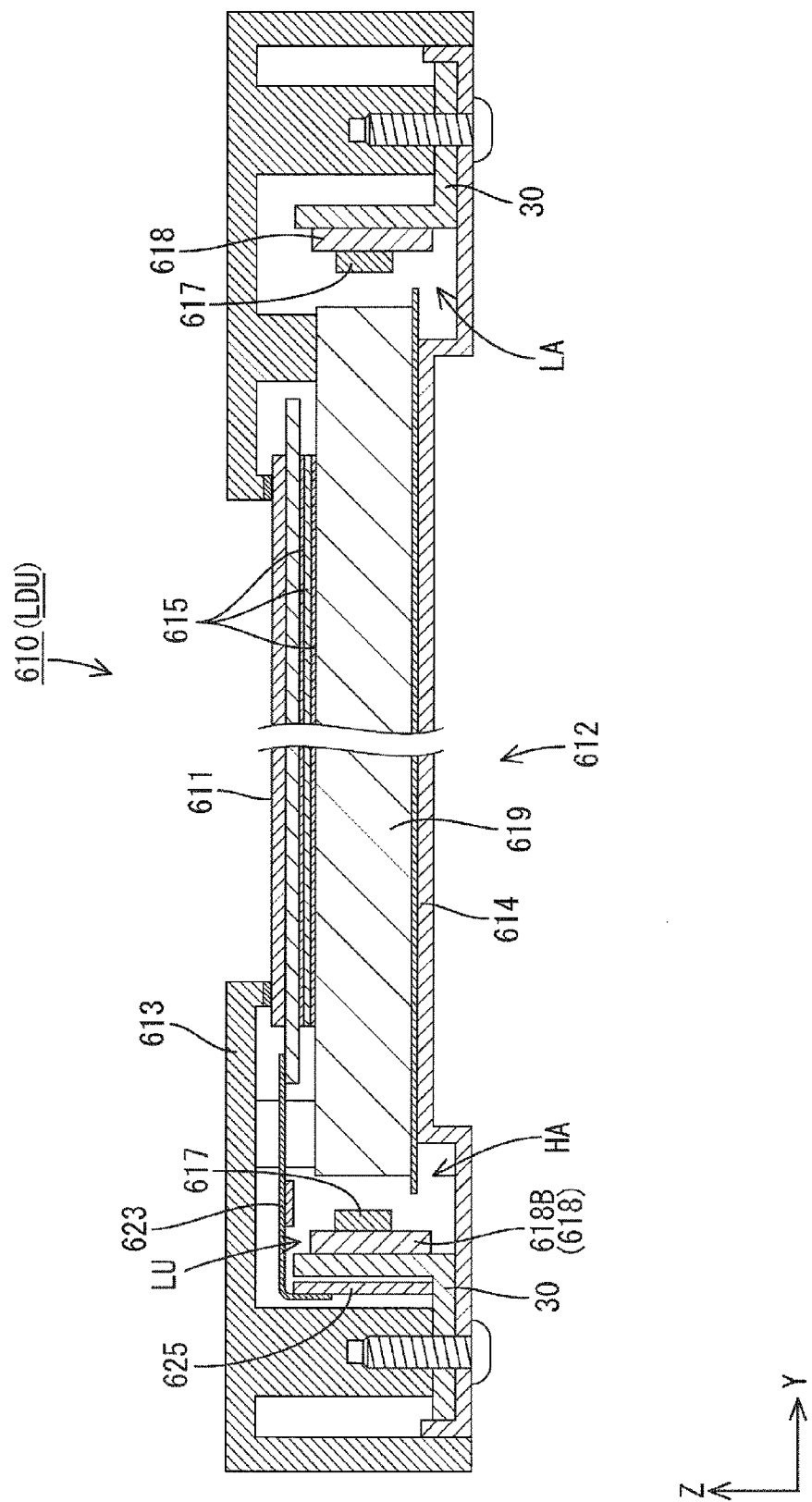

LIGHTING DEVICE, DISPLAY DEVICE AND TELEVISION DEVICE

TECHNICAL FIELD

A technology described herein relates to alighting device, a display device, and a television device.

BACKGROUND ART

In recent years, displays in image display devices, such as television devices, are being shifted from conventional cathode-ray tube displays to thin displays, such as liquid crystal displays and plasma displays. With the thin displays, thicknesses of the image display devices can be decreased. Liquid crystal panels do not emit light. Therefore, liquid crystal display devices including liquid crystal panels require backlight devices. The backlight devices are classified broadly into a direct type and an edge-light type based on mechanisms. For further reduction in thicknesses of the liquid crystal display devices, the edge-light type backlight devices are more preferable. A backlight device disclosed in Patent Document 1 is known as an example of the kind.

RELATED ART DOCUMENT

Patent Document

Patent Document 1: Japanese Unexamined Patent Publication No. 2010-282911

Problem to be Solved by the Invention

In the backlight device disclosed in Patent Document 1, two series of light sources are arranged along corresponding sides of a light guide plate. Temperatures of the light sources arranged on the upper side with respect to the vertical direction tend to increase. To make temperature environments of the light sources even, the light sources on the upper side are arranged with larger intervals than those of the light sources on the lower side. Furthermore, a light reflection portion of the backlight device disclosed in Patent Document 1 for directing the light from the light guide plate to the outside is configured to achieve even brightness within an area of a light exit surface of the light guide plate.

However, in the backlight device disclosed in Patent Document 1, the light sources are arranged different intervals and thus a cost required for arranging the light sources increases. Furthermore, voltages applying to the light sources have large differences therebetween and thus a cost required for a drive circuit also increases.

Disclosure of the Present Invention

The technology disclosed herein was made in view of the above circumstances. An object is to reduce costs and uneven brightness while equalizing temperature environments of light sources.

Means for Solving the Problem

A lighting device according to the technology includes a first light source, a second light source, a light guide plate, a light source driver, and light reflection portions. The second light source is opposed to the first light source and arranged in a high temperature area in which a temperature tends to become higher than an area in which the first light source is arranged. The light guide plate is arranged between the first light source and the second light source. The light guide plate is configured such that rays of light from the first light source and the second light source enter through end surfaces opposite the first light source and the second light source, respectively, and exit through a plate surface on a light exiting side. The light source driver is configured to drive the first light source and the second light source to supply a smaller current to the second light source than a current supplied to the first light source. The light reflection portions are configured to reflect rays of light in the light guide plate to the light exiting side to increase rays of light exiting from the plate surface of the light guide plate on the light exiting side. The light reflection portions are arranged such that an area distribution in a plane of the plate surface of the light guide plate increases as a distance from corresponding one of the first light source and the second light source increases and takes a maximum value at a point closer to the second light source.

With this configuration, the rays of light emitted by the first light source and the second light source enter the light guide plate through the end surfaces opposite the first light source and the second light source, respectively. Then, the rays of light are reflected to the light exiting side by the light reflection portions during travel through the light guide plate. Therefore, more rays of light exit through the plate surface on the light exiting side. The light source driver supplies the smaller current to the second light source than the current supplied to the first light source. Therefore, an amount of heat generated by the second light source is smaller than an amount of heat generated by the first light source. The second light source is arranged in the high temperature area in which the temperature tends to become higher than the area in which the first light source is arranged. By maintaining the amount of heat at a low level by the light source driver, a difference in temperature between the first light source and the second light source can be compensated. To equalize temperature environments of the light sources, different amounts of current are supplied from the light source driver to the light sources. In comparison to a known lighting device in which light sources are sparsely arranged, a cost for mounting the light sources can be reduced. Furthermore, a difference in voltage applied to the light sources is small and thus a cost related to the drive circuit can be reduced. Namely, this lighting device has an advantage in cost.

The amount of light emission from the second light source is controlled smaller than the amount of light emission from the first light source by the light source driver. Therefore, unevenness may occur among rays of light exiting from the light guide plate through the plate surface thereof. The light reflection portions configured to reflect rays of light in the light guide plate to the light exiting side are arranged such that the area distribution in the plane of the plate surface of the light guide plate increases as the distance from the corresponding one of the first light source and the second light source increases and takes the maximum value at the point closer to the second light source. With this configuration, the rays of light from the first light source, the amount of light emission of which is relatively large, are less likely to be reflected by the light reflection portions. On the other hand, the rays of light from the second light source, the amount of light emission of which is relatively small, are more likely to be reflected by the light reflection portions. Therefore, the amounts of light exiting from the light guide plate through the plate surface on the light exiting side are equalized and thus uneven brightness is less likely to occur.

The following configurations are preferable embodiments of the lighting device according to the technology.

(1) The first light source and the second light source include unit light sources arranged in a line along the end surfaces of the light guide plate. The number and intervals of the unit light source along one of the end surfaces are equal to those of the unit light sources along the other one of the end surfaces. Because the first light source and the second light source having the same configuration are used, a cost for mounting the light sources can be reduced.

(2) The area of the light reflection portions in an edge area of the light guide plate closer to the first light source is smaller than the area of the light reflection portions in an edge area of the light guide plate closer to the second light source. With this configuration, the rays of light from the first light source, the amount of light emission of which is relatively large, are less likely to be reflected by the light reflection portions in the edge area closer to the first light source. On the other hand, the rays of light from the second light source, the amount of light emission of which is relatively small, are more likely to be reflected by the light reflection portions in the edge area closer to the second light source. Therefore, a difference in emitted light between the edge area closer to the first light source and the edge area closer to the second light source is less likely to be produced. This configuration is more preferable for reducing uneven brightness.

(3) The light reflection portions include a number of dots dispersedly arranged on a plate surface of the light guide plate opposite from the plate surface on the light exiting side. By providing the light reflection portions with a number of dots, a reflection level can be adjusted by modifying dot patterns (e.g., number, area, intervals). This configuration has an advantage in providing even brightness.

(4) The light reflection portions are arranged such that a ration of a distance from the point at which the area of the light reflection portions in the plane of the plate surface of the light guide plate is the maximum to the first light source to a distance from the point at which the area of the light reflection portions is the maximum to the second light source is about equal to a ratio of the current supplied to the first light source by the light source drive circuit to the current supplied to the second light source by the light source drive circuit. With this configuration, the light reflection portions can be easily designed based on the ratio of the currents supplied from the light source driver to the light sources. This provides high productivity and further reduces the cost. In comparison to a case that the light reflection portions are designed based on a brightness ratio regarding light emissions of the light sources, a cost required for designing the light reflection portions can be further reduced because it is not necessary to measure the brightness.

(5) The light reflection portions are arranged such that a ratio of a distance from the point at which the area of the light reflection portions in the plane of the plate surface of the light guide plate is the maximum to the first light source to a distance from the point at which the area of the light reflection portion is the maximum to the second light source is about equal to a ratio of the current supplied to the first light source by the light source drive circuit to the current supplied to the second light source by the light source drive circuit. With this configuration, the light reflection portions can be easily designed based on the brightness ratio regarding light emissions of the light sources. This provides high productivity and further reduces the cost. Regarding the current-brightness characteristics of the light source, the ratio between currents supplied to the light sources and the ratio between brightness levels of light emitted by the light sources may not be equal. However, the light reflection portions are designed based on the brightness levels of the light emitted by the light sources. In comparison to the configuration including the light reflection portions designed based on the ratio of the currents supplied to the light sources, the differences in light emission between the light sources can be more properly compensated. Therefore, unevenness is further less likely to occur in the brightness levels of rays of light exiting from the light exiting surface of the light guide plate.

(6) A distance between the first light source and one of the end surfaces of the light guide plate is larger than a distance between the second light source and the other one of the end surface of the light guide plate. The incident efficiency tends to be inversely proportional to the distance between the first light source and one of the end surfaces. When the distance between the first light source and one of the end surfaces of the light guide plate is relatively large, the rays of light from the first light source, the amount of light emission of which is larger, are less likely to enter the end surface of the light guide plate. When the distance between the second light source and the other end surface of the light guide plate is relatively small, the rays of light from the second light source, the amount of light emission of which is smaller, are more likely to be efficiently directed to and enter the end surface of the light guide plate. With this configuration, uneven brightness is further less likely to occur. Even if the difference in current supplied from the light source drive circuit board to the light sources becomes so large that the uneven brightness cannot be reduced with the uneven area distribution of the light reflection portions, the uneven brightness can be compensated through the configuration in which the distance between the light source and one of the end surfaces of the light guide plate and the distance between the light source and the other one of the end surfaces of the light guide plate are different.

(7) The lighting device further includes a chassis and a light source drive circuit. The chassis holds the first light source, the second light source, and the light guide plate therein. The light source drive circuit board includes a light source drive section. The light source drive circuit board is mounted to the chassis on an opposite side from the light exiting side and arranged closer to the second light source. With this configuration, the light source drive circuit board generates heat as the light sources are driven by the light source driver. The light source drive circuit board is mounted to the opposite side of the chassis from the light exiting side and arranged closer to the second light source. Namely, the second light source is arranged in the high temperature area in which the temperature tends to become higher than in the area in which the first light source is arranged. The light source driver supplies the smaller current to the second light source than the current supplied to the first light source. Therefore, the amount of heat generated by the second light source is maintained small and thus the difference in temperature between the first light source and the second light source can be compensated.

To resolve the problem described earlier, a display device according to the technology includes the lighting device described above and a display panel configured to provide a display using light from the lighting device.

According to such a display device, the lighting device configured to provide light to the display panel is less likely to produce uneven brightness. Therefore, the display device can perform high quality image display.

Preferred embodiments of the display device according to the technology are as follows.

(1) The display device includes a panel driver connected to the display panel. The panel driver is configured to drive the display panel and arranged closer to the second light source. With this configuration, the panel driver generates heat during the driving of the display panel. The panel driver is arranged closer to the second light source. Namely, the second light source is arranged in a high temperature area in which a temperature tends to become higher than the area in which the first light source is arranged. The light source driver supplies the smaller current to the second light source than the current supplied to the first light source. Therefore, the amount of heat generated by the second light source is maintained small and thus the difference in temperature between the first light source and the second light source can be compensated.

(2) The lighting device includes a chassis that holds the first light source, the second light source, and the light guide plate therein. The lighting device includes a panel driver and a panel drive control circuit board. The panel driver is connected to the display panel and configured to drive the display panel. The panel drive control circuit board is connected to the panel driver. The panel drive control circuit board is configured to control driving of the panel driver, mounted to the chassis on an opposite side from the light exiting side, and arranged closer to the second light source. With this configuration, the panel drive control circuit board generates heat during the driving of the panel driver. The panel driver control circuit board is mounted to the chassis on the opposite side from the light exiting side and arranged closer to the second light source. Namely, the second light source is arranged in a high temperature area in which a temperature tends to become higher than the area in which the first light source is arranged. The light source driver supplies the smaller current to the second light source than the current supplied to the first light source. Therefore, the amount of heat generated by the second light source is maintained small and thus the difference in temperature between the first light source and the second light source can be compensated.

(3) Examples of the display panel include a liquid crystal display panel. The display device may be adapted to various purposes such as television devices and display devices of personal computers. Preferable purposes include large screen display devices.

Advantageous Effect of the Invention

According to the technology, the temperature environments can be equalized between the light sources and the uneven brightness can be reduced while the cost is maintained low.

BRIEF DESCRIPTION OF THE DRAWINGS

FIG. 1 is an exploded perspective view illustrating a general configuration of a television device TV according to a first embodiment of the technology.

FIG. 22 is an exploded perspective view illustrating a general configuration of a television device and a liquid crystal display device according to a seventh embodiment of the technology.

FIG. 23 is an exploded perspective view illustrating a general configuration of a liquid crystal display unit included in a liquid crystal display device.

FIG. 24 is a cross-sectional view illustrating a cross-sectional configuration along a short-side direction of the liquid crystal display device.

MODE FOR CARRYING OUT THE INVENTION

First Embodiment

The first embodiment of this technology will be described with reference to FIGS. 1 to 9. In the following description, a liquid crystal display device 10 will be described. An X-axis, a Y-axis, and a Z-axis are present in some drawings. The axes in each drawing correspond to the respective axes in other drawings. The X-axes and Y-axes correspond to the horizontal direction and the vertical direction, respectively. In the following description, the upper side and the lower side in FIG. 3 correspond to the front and the rear of the liquid crystal display device, respectively.

Figure 2:
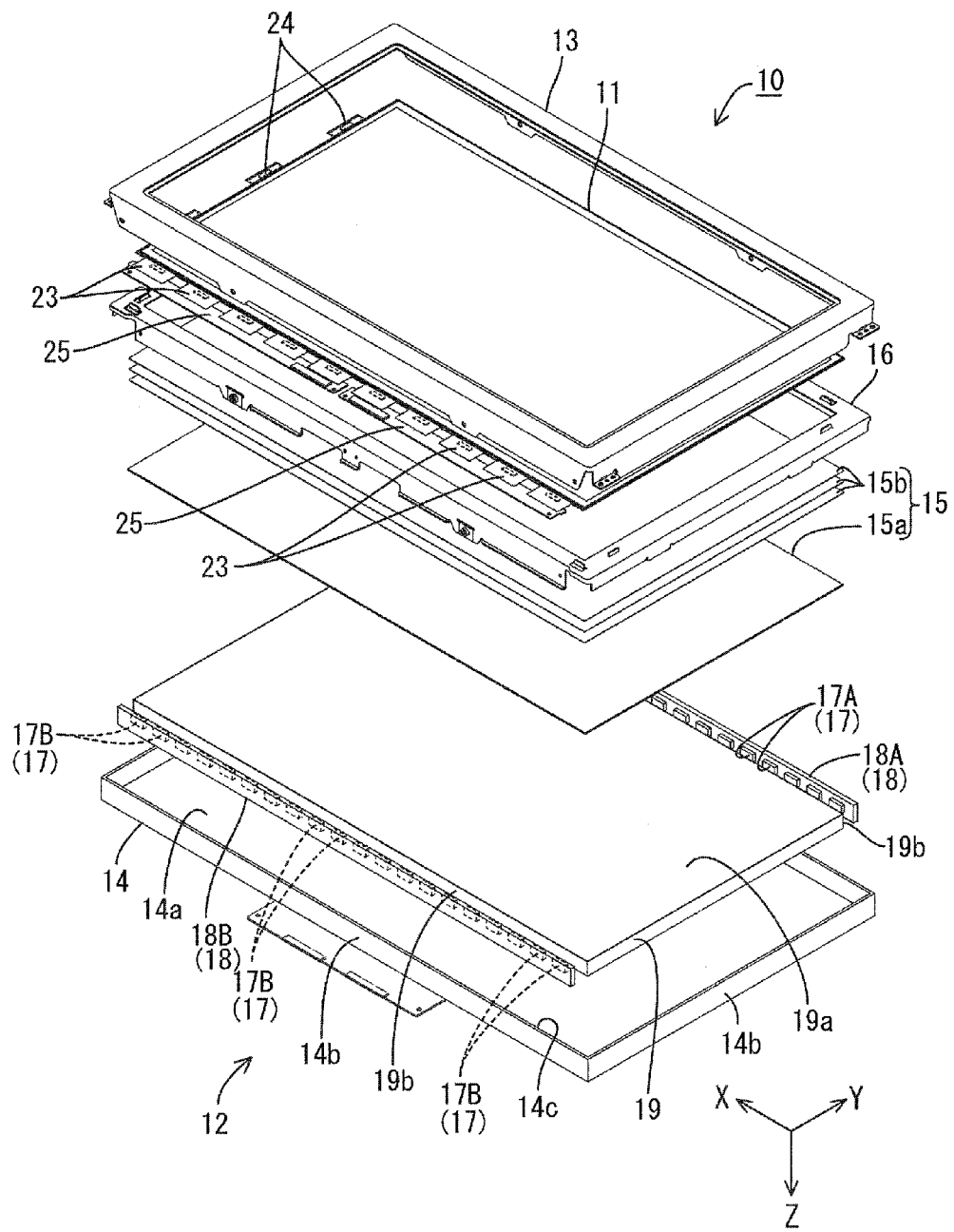
FIG. 2 is an exploded perspective view illustrating a general configuration of a liquid crystal display device.

As illustrated in FIG. 1, a television device TV includes a liquid crystal display device 10, a front cabinet Ca, a rear cabinet Cb, a power supply P, a tuner T, and a stand S. The front cabinet Ca and the rear cabinet Cb hold the liquid crystal display device 10 therebetween. The liquid crystal display device (a display unit) 10 has a landscape rectangular overall shape (rectangular and longitudinal shape). The liquid crystal display device 10 is held in the vertical position. As illustrated in FIG. 2, the liquid crystal display device 10 includes a liquid crystal panel 11 and a backlight (a lighting device) 12. The liquid crystal panel 11 is a display panel. The backlight is an external light source. The liquid crystal panel 11 and the backlight 12 are held together by other components including a frame 13.

As illustrated in FIG. 2, the liquid crystal panel 11 has a landscape rectangular (rectangular and longitudinal shape) in a plan view. The liquid crystal panel 11 includes a pair of glass substrates 11a and 11b having high light transmissivity are bonded together with a predetermined gap therebetween. Liquid crystals are sealed between the substrates 11a and 11b. One of the substrates 11a and 11b on the front side is a CF board 11a and the other substrate on the rear is an array board 11b. On the array board 11b, switching elements (e.g. TFTs), pixel electrodes, and an alignment film are arranged. The switching elements are connected to gate lines and source lines that are arranged perpendicular to each other. The pixel electrodes are connected to the switching elements. Specifically, a number of the TFTs and the pixel electrodes are arranged on the array board 11b and a number of the gate lines and the source lines are arranged in matrix so as to surround the TFTs and the pixel electrodes. The gate lines and the source lines are connected to gate electrodes and electrodes of the respective TFTs. The pixel electrodes are connected to drain electrodes of the respective TFTs. Furthermore, capacitive lines (auxiliary capacitive lines, storage capacitive lines, Cs lines) are arranged parallel to the gate lines and over the pixel electrode in a plan view. On the CF board 11a, color filters, a counter electrode, and an alignment film are arranged. The color filters include red (R), green (G), and blue (B) color portions that are arranged in a predetermined arrangement. The liquid crystal panel 11 includes a display area and a non-display area. The display area is an inner area of a screen in which images are displayed. The non-display area is an outer area of the screen around the display area with a frame-like shape. The polarizing plates are arranged on outer sides of the substrates 11a and 11b.

Figure 3:
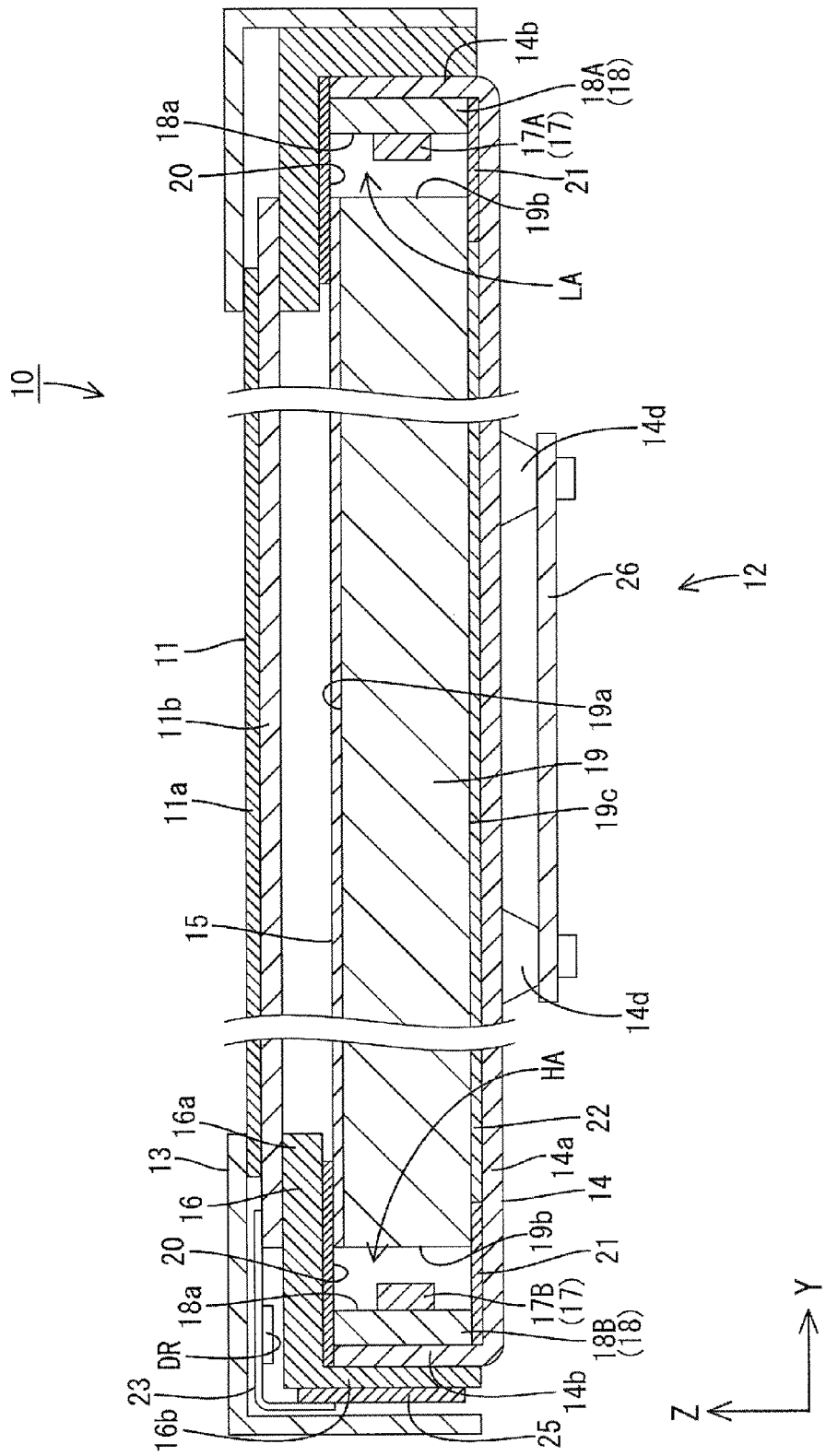
FIG. 3 is a cross-sectional view illustrating a cross-sectional configuration of the liquid crystal display device along a short-side direction thereof.

As illustrated in FIGS. 2 and 3, the array board 11b of the substrates 11a and 11b of the liquid crystal panel 11 has a larger size in a plan view than the CF board 11a. Therefore, peripheral edges of the array board 11b are located farther out than peripheral edges of the CF board 11a. Specifically, the array board 11b is slightly larger than the CF board 11a such that the entire peripheral edges of the array board 11a are farther out than the peripheral edges of the CF board 11a. Source-side terminals are arranged at one of long edges of the peripheral edges of the array board 11b (the lower side in FIG. 2, the left side in FIG. 3). The source-side terminals are connected to the source lines and to source-side flexible circuit boards (panel driving members, source drivers) 23, respectively. The source-side flexible circuit boards 23 are arranged at certain intervals along the X-axis direction, that is, the long edge of the array board 11b. The source-side flexible circuit boards 23 extend outward from the long edge of the array board 11b in the Y-axis direction. Gate-side terminals are arranged at one of short edges of the peripheral edges of the array board 11b (the upper side in FIG. 2). The gate-side terminals are connected to the gate lines and the capacitive lines. The gate-side terminals are connected to gate-side flexible circuit boards (panel driving members, gate drivers) 24. The gate-side flexible circuit boards 24 are arranged at certain intervals. The gate-side flexible circuit boards 24 extend outward from the short edge of the array board 11b in the X-axis direction.

As illustrated in FIG. 3, each of the flexible circuit boards 23 and 24 includes a film-like base member and a driver (an LSI for driving the panel) DR mounted on the base member. The base member is made of synthetic resin having insulating properties and flexibility (e.g., a resin containing polyimide). The driver DR is for driving liquid crystals. A number of traces (not illustrated) are formed on the base member and connected to the driver DR mounted at about the center of the base member. Each source-side flexible circuit board 23 is connected to the driver DR at one end and connected to the terminal of a printed circuit board 25, which will be described later, at the other end by pressure bonding via an anisotropic conductive film (ACF). The printed circuit board 25 is connected to the control circuit board 27 described earlier (see FIG. 6) via a wiring member (e.g., an FPC) which is not illustrated. The printed circuit board 25 is configured to transmit signals input from the control circuit board 27 (scan signals to the gate lines, data signals to the source lines, capacitive signals to the capacitive lines) to the source-side flexible circuit boards 23. Each gate-side flexible circuit board 23 is connected to the gate-side terminal of the array board 11b at one end via an anisotropic conductive film by pressure bonding. Relay lines (not illustrated) which connect the source-side terminals to the gate-side terminals are formed on the array board 11b. Signals from the source-side flexible circuit boards 23 and the source-side terminals (e.g., scan signals to the gate lines, capacitive signals to the capacitive lines) are transmitted to the gate-side terminals and the gate-side flexible circuit board 24 via the relay lines. With this configuration, images are displayed on a display surface of the liquid crystal panel 11 based on signals input from the control circuit board 27.

As illustrated in FIG. 2, the backlight 12 includes a chassis 14 and an optical member 15. The chassis 14 has a box-like shape with a light exiting portion 14c that is an opening on the front side (on the light exiting side, on the liquid crystal panel 11 side). The optical member 15 is arranged so as to cover the light exiting portion 14c of the chassis 14. In the chassis 14, light emitting diodes (LEDs) 17, LED boards 18, a light guide plate 19, and a frame (a holding member) 16 are arranged. The LEDs 17 are unit light sources and mounted on the LED boards 18. The light guide plate 19 is configured to direct rays of light from the LEDs 17 to the optical member 15 (or the liquid crystal panel 11). The frame 16 holds down the light guide plate 19 and the optical member 15 from the front side. Furthermore, An LED drive circuit board (a light source drive circuit board) 26 and the control circuit board 27 are mounted to a back surface of the chassis 14. The LED drive circuit board 16 is configured to supply driving power to the LEDs 17. The control circuit board 27 is configured to supply signals for driving the liquid crystals to the liquid crystal panel 11. In the backlight 12, the LED boards 18 are arranged opposite to each other at the respective long edges thereof and the light guide plate 19 is arranged in an inner area thereof sandwiched between the LED boards 18. Namely, the backlight 12 is a so-called edge light type (a side light type). In the following description, components of the backlight will be described in detail.

Figure 4:
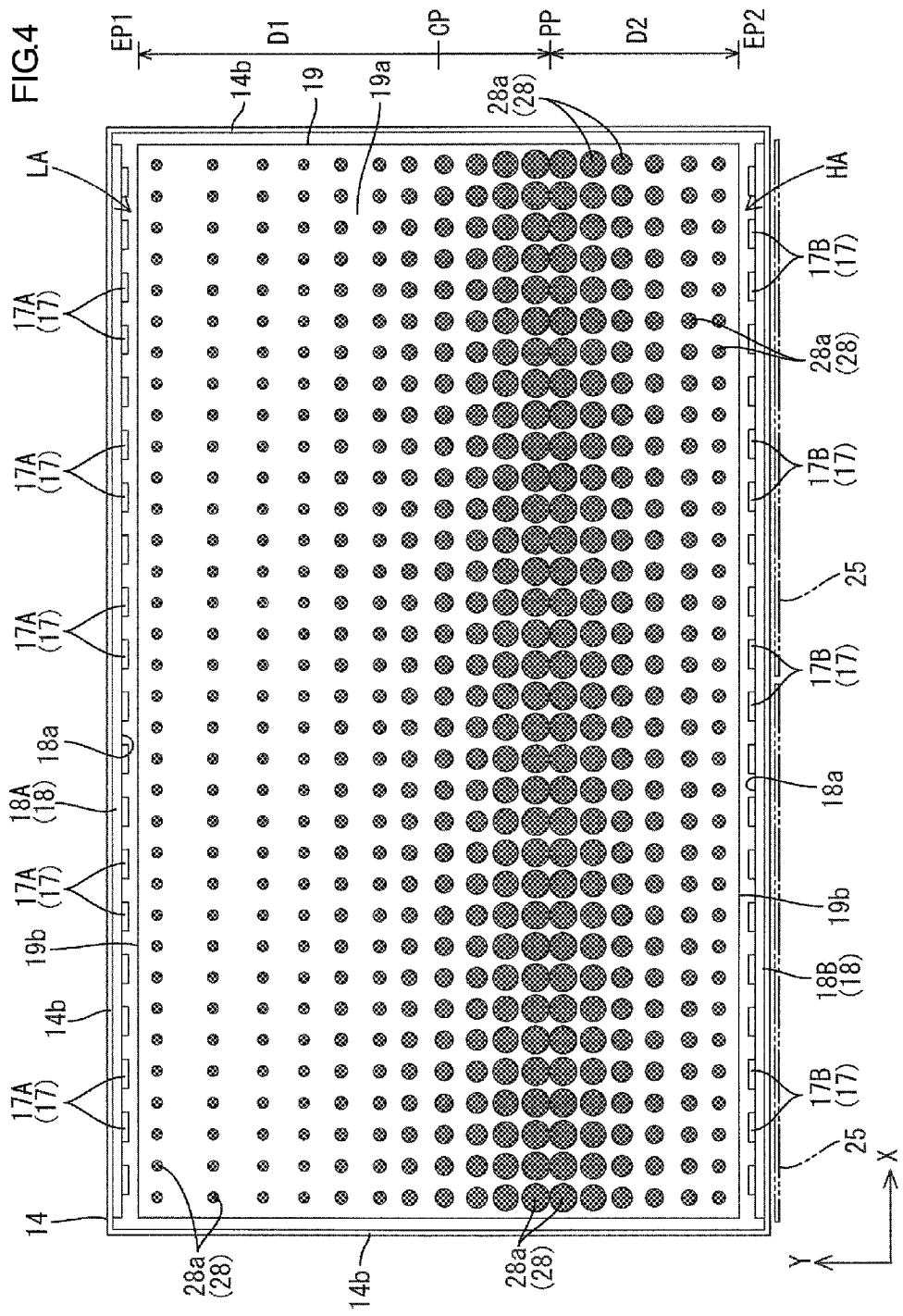
FIG. 4 is a plan view illustrating an arrangement of a chassis, a light guide plate, and an LED board in a backlight included in the liquid crystal display device.
Figure 6:
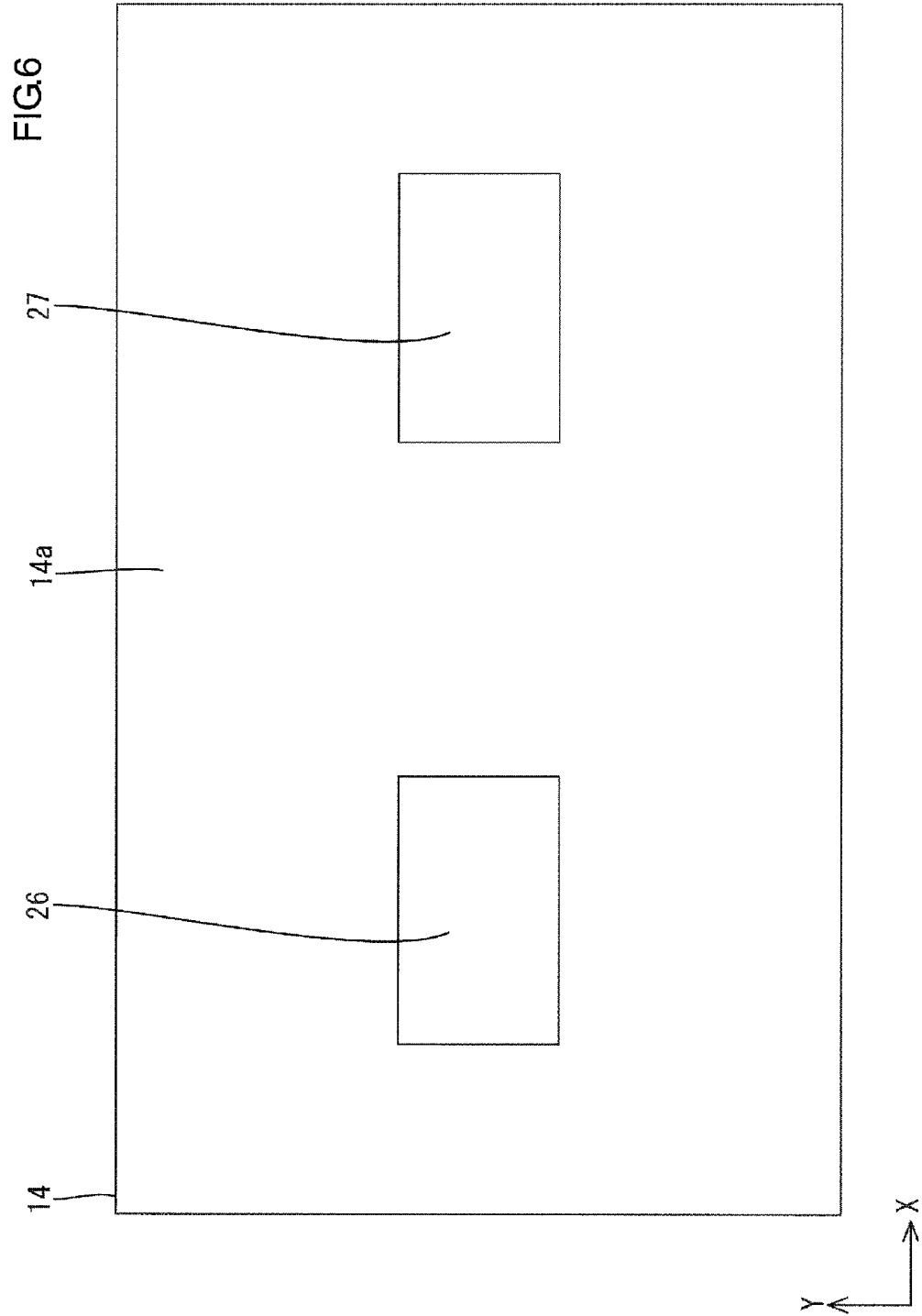
FIG. 6 is a rear view illustrating an arrangement of the chassis, an LED drive circuit board, and a control circuit board.

The chassis 14 is constructed of metal sheets, for example, aluminum sheets or electrolytic zinc-coated steel sheets (SECC). As illustrated in FIGS. 2 and 4, the chassis 14 includes a bottom plate 14a and side plates 14b. The bottom plate 14a has a rectangular shape similar to the liquid crystal panel 11. The side plates 14 project at an angle from long edges and short edges of the bottom plate 14a, respectively. The long-side direction of the chassis 14 (or the bottom plate 14a) corresponds to the X-axis direction (i.e., the horizontal direction) and the short-side direction thereof corresponds to the Y-axis direction (i.e., the vertical direction). The bottom plate 14a extends along the light guide plate 19 and a third reflection sheet 22 and supports the light guide plate 19 and the third reflection sheet 22 from the rear side. As illustrated in FIG. 6, the LED drive circuit board 26 and the control circuit board 27 are mounted to the rear surface of the bottom plate 14a, that is, on a side of the chassis 14 opposite from the light guide plate 19. The LED drive circuit board 26 and the control circuit board 27 are arranged at about the middle of the bottom plate 14a with respect to the Y-axis direction. Therefore, a distance between one of the LED boards 18 and the LED drive circuit board 26 or the control circuit board 27 in the Y-axis direction is about equal to a distance between the other LED board 18 and the LED drive circuit board 26 or the control circuit board 27 in the Y-axis direction. The LED drive circuit board 26 and the control circuit board 27 are about symmetrically arranged on the bottom plate 14a away from each other in the X-axis direction. As illustrated in FIG. 3, the bottom plate 14a includes mounts 14d that project to the rear side in areas in which the boards 26 and 27 are mounted. The boards 26 and 27 are placed on the mounts 14d and fixed to the bottom plate 14a with screws. The frame 16 and the bezel 13 can be screwed to the side plates 14b.

As illustrated in FIG. 2, the optical member 15 has a landscape rectangular shape in a plan view similar to the liquid crystal panel 11 and the chassis 14. The optical member 15 is arranged on the front surface of the light guide plate 19 (on the light exiting side) between the liquid crystal panel 11 and the light guide plate 19. The optical member 15 includes a diffuser plate 15a arranged on the rear side and an optical sheets 15b arranged on the front side. The diffuser plate 15a includes a base member made of nearly transparent synthetic resin and having a plate-like shape with a predefined thickness. The diffuser plate 15a further includes a number of diffusing particles dispersed inside the base member. The diffuser plate 15a is configured to diffuse light that passes therethrough. Each optical sheet 15b has a thickness smaller than that of the diffuser plate 15a. Three optical sheets 15b are layered. Specific examples of the optical sheets 15b include a diffuser sheet, a lens sheet, and a reflective-type polarizing sheet and any of them are selected as appropriate for the optical sheets 15b. In FIG. 3, the optical member 15 is not illustrated.

The frame 16 is made of synthetic resin. As illustrated in FIGS. 2 and 3, the frame 16 includes a frame portion 16a and a peripheral wall portion 16b. The frame portion 16a is parallel to the optical member 15 and the light guide plate 19. The frame portion 16a has a frame-like shape in a plan view. The frame portion 16a extends along peripheral edges of the optical member 15 and the light guide plate 1. The frame portion 16a is configured to hold down about the entire peripheral edges of the optical member 15 and the light guide plate 19 from the front side. The peripheral wall portion 16b projects from the peripheral edges of the frame portion 16a toward the rear side. The peripheral wall portion 16b is held against outer surfaces of the side plates 14b of the chassis 14 and fixed. The printed circuit board 25 connected to the source-side flexible circuit boards 23 is mounted to an outer surface of a long-side portion of the peripheral wall portion 16b on the left in FIG. 3. As illustrated in FIG. 3, first reflection sheets 20 for reflecting rays of light are attached to back surfaces of long-side portions of the frame portion 16a, that is, surfaces opposite the light guide plate 19 and the LED boards 18 (or the LEDs 17), respectively. Each first reflection sheet 20 has a length to extend for about the entire length of the long-side portion of the frame 16. The first reflection sheets 20 collectively cover end portions of the light guide plate 19 on the LED 17 side and the LED boards 18 from the front side. The frame portion 16a receives the peripheral edges of the liquid crystal panel 11 from the rear side.

As illustrated in FIGS. 3 and 4, each LED 17 includes an LED chip arranged on a board that is fixed on the LED board 18 and sealed with resin. The LED chip mounted on the board is configured to emit light at one main light emission wavelength. Specifically, the LED chip that emits light in a single color of blue is used. The resin that seals the LED chip contains phosphors dispersed therein. The phosphors emit light in a predetermined color when excited by blue light emitted from the LED chip. Thus, overall color of light emitted from the LED 17 is white. The phosphors may be selected, as appropriate, from yellow phosphors that emit yellow light, green phosphors that emit green light, and red phosphors that emit red light. A combination of the above phosphors may be used. The LED 17 includes a light-emitting-surface 17a that is opposite to a surface on which the LED board 18 is mounted. Namely, the LED 17 is a so-called top-surface-emitting type LED.

As illustrated in FIGS. 2 through 4, each LED board 18 has an elongated plate-like shape that extends along the long-side direction (the X-axis direction, the longitudinal direction of the light entrance surface 19b of the light guide plate 19). Each LED board 18 is held in a position such that a plate surface thereof is parallel to the X-Z plane, that is, perpendicular to plate surfaces of the liquid crystal panel 11 an the light guide plate 19, inside the chassis 14. The LED boards 18 are arranged at long edges of the chassis 14, respectively, and attached to inner surfaces of the respective side plates 14b at the long edges. Inner surfaces of the LED boards 18 opposite the light guide plate 19 (surfaces opposed to the light guide plate 19) are mount surfaces 18a on which the LEDs 17 having the configurations described earlier are surface mounted. The LEDs 17 are arranged in a line (i.e., linearly) along the longitudinal direction of the LED board 18 (the X-axis direction) at predetermined intervals on the mount surface of each LED board 18. Namely, the LEDs 17 are arranged at intervals along the longitudinal directions at the long edges of the backlight 12 parallel to each other. The intervals between the adjacent LEDs 17 with respect to the X-axis direction, that is, arrangement pitches of the LEDs 17 are substantially equal. The arrangement direction of the LEDs 17 corresponds to the longitudinal direction (the X-axis direction) of the LED boards 18.

Metal film (e.g., copper foil) traces (not illustrated) are formed on the mount surface 18a of each LED board 18. The traces extend along the X-axis direction and connect the adjacent LEDs 17 that across the grope of the LEDs 17. The traces connect the adjacent LEDs 17 to each other in series. When terminals at ends of the traces are connected to the external LED drive circuit 26 via wiring members, which are not illustrated, driving power is supplied to each LED 17. The base member of each LED board 18 is made of metal, as the chassis is so. The traces (not illustrated) are formed on the surface of the base member via an insulating layer. An insulating material such as a ceramic material may be used for the base member of the LED board.

The LED boards 18 have such a configuration. As illustrated in FIG. 4, the numbers of the LEDs 17 disposed on the LED boards 18 (the numbers of the LEDs 17 mounted on the LED boards 18) are substantially equal. Furthermore, the intervals of the LEDs 17 disposed on the LED boards 18 (the intervals of the LEDs 17 mounted on the LED boards 18, the arrangement pitches) are substantially equal. The LED boards 18 are the same parts. Therefore, a production cost and a cost required for parts management of the LED boards 18 can be reduced. The LED boards 18 are held in positions inside the chassis 14 such that the mount surfaces 18*a* on which the LEDs 17 are mounted face each other. The light emitting surfaces of the LEDs 17 on one of the LED boards 18 faces the light emitting surfaces of the LEDs 17 on the other one of the LED boards 18. Optical axes of the LEDs 17 are substantially parallel to the Y-axis direction. Namely, the LEDs 17 mounted on the LED boards 18 face the respective ends (the long edge side) of the light guide plate 19.

The light guide plate 19 is made of synthetic resin having a refractive index sufficiently higher than that of air and substantially transparent (having high light transmissivity). For example, the light guide plate 19 is made of acrylic resin such as PMMA or polycarbonate. As illustrated in FIG. 2, the light guide plate 19 has a landscape rectangular shape in a plan view similar to the liquid crystal panel 11 and the chassis 14. The light guide plate 19 has a thickness larger than the optical member 15. The long-side direction corresponds to the X-axis direction and the short-side direction corresponds to the Y-axis direction. As illustrated in FIG. 3, the light guide plate 19 is arranged directly below the liquid crystal panel 11 and the optical member 15 inside the chassis 14. The light guide plate 19 is sandwiched between the LED boards 18 arranged at the long edges of the chassis 14 with respect to the Y-axis direction. Therefore, an arrangement direction in which the LEDs 17 (the LED boards 18) and the light guide plate 19 are arranged corresponds to the Y-axis direction. An arrangement direction in which the optical member 15 (or the liquid crystal panel 11) and the light guide plate 19 are arranged corresponds to the Z-axis direction. Those arrangement directions are perpendicular to each other. The light guide plate 19 is configured to receive rays of light emitted from the LEDs 17 in the Y-axis direction, transmit it therethrough, and direct toward the optical member 15 (to the front side) so that the rays of light exit thereto.

The light guide plate 19 has a substantially flat shape that extends along the plate surfaces of the bottom plate 14*a* of the chassis 14 and the optical member 15. The plate surface of the light guide plate 19 is parallel to the X-Y plane. A plate surface of the light guide plate 19 facing toward the front (a surface opposite the optical member 15) among the front and the rear plate surfaces thereof is a light exiting surface 19*a*. Light inside the light guide plate 19 exits toward the optical member 15 and the liquid crystal panel 11 through the light exiting surface 19*a*. Among peripheral surfaces of the light guide plate 19 adjacent to the plate surface thereof, long peripheral surfaces having a longitudinal shape along the X-axis direction are opposite the LEDs 17 (or the LED boards 18) with predetermined gaps. The peripheral surfaces are light entrance surfaces 19*b* through which rays of light emitted by the LEDs 17 enter. Distances between the LEDs 17 (or the LED boards 18) and the respective light entrance surfaces 19*b* are substantially the same. As illustrated in FIG. 4, the first reflection sheets 20, described earlier, are arranged more to the front than a space between the LEDs 17 and the light entrance surface 19*b*. The second reflection sheet 21 is arranged more to the rear than the space. The first reflection sheets 20 and the second reflection sheet 21 are arranged such that the space is located therebetween. With this configuration, rays of light emitted by the LEDs 17 are repeatedly reflected by the reflection sheets 20 and 21 and thus the rays of light efficiently enter the light guide plate 19 through the light entrance surface 19*b*. The light entrance surfaces 19*b* are parallel to the X-axis direction (the arrangement direction of the LEDs 17) and the Z-axis direction, that is, parallel to the plate surfaces of the respective LED boards 18 and perpendicular to the light exiting surface 19*a*. A direction in which the LEDs and the light entrance surface 19*b* are arranged is corresponds to the Y-axis direction and parallel to the light exiting surface 19*a*.

As illustrated in FIG. 3, the third reflection sheet 22 is disposed on the rear surface of the light guide plate 19, that is, the plate surface (a surface opposite the bottom plate 14*a* of the chassis 14) 19*c* away from the light exiting surface 19*a* of the light guide plate 19 so as to cover about the entire surface. The third reflection sheet 22 is for reflection light exiting the light guide plate 19 through the plate surface 19*c* to the rear side toward the front side. The third reflection sheet 22 is sandwiched between the bottom plate 14*a* of the chassis 14 and the light guide plate 19. Light reflection portions 28 are formed on the plate surface 19*c* away from the light exiting surface 19*a* of the light guide plate 19. The light reflection portions 28 are for reflecting rays of light inside the light guide plate 19 toward the light exiting surface 19*a* to increase the rays of light exiting through the light exiting surface 19*a*. The light reflection portions 28 are located between the plate surface 19*c* away from the light exiting surface 19*a* and the third reflection sheet 22.

As illustrated in FIG. 3, the light reflection portions 28 are formed by printing a light reflective material on the plate surface 19*c* of the light guide plate 19 away from the light existing surface 19*a*. Namely, the light reflection portions 28 may be referred to as light reflective prints. The light reflective material used for the light reflection portions 28 is a white ink (or a paste) containing a metal oxide such as a titanium oxide. The light reflection portions 28 are configured to diffusely reflect the rays of light entering the light guide plate 19 and reaching the plate surface 19*c* away from the light exiting surface 19*a* toward the light exiting surface 19*a*. The light reflection portions 28 are further configured to vary an angle of incidence at the light exiting surface 19*a* from an angle of incidence of light that is fully reflected at the light exiting surface 19*a*. With this configuration, more rays of light, the angles of incidence of which do not exceed the critical angle exist and thus the amount of light that exits through the light exiting surface 19*a* increases.

As described earlier and illustrated in FIGS. 2 and 3, the source-side flexible circuit boards 23 and the printed circuit board 25 connected to the liquid crystal panel 11 are arranged on one of the long sides of the liquid crystal display device 10, that is, closer to one of the LED boards 18. Specifically, the source-side flexible circuit boards 23 are arranged on the front side of the LED board 18 on the left in FIG. 3 via the frame portion 16*a* of the frame 16 so as to overlap the LED board 18 in a plan view. The printed circuit board 25 is arranged on the outer side (lateral) of the LED board 18 on the left in FIG. 3 via the side plate 14*a* of the chassis 14 and the peripheral wall portion 16*b* of the frame 16 so as to overlap the LED board 18 in a side view. The LED board 18 on the left (one of the LED boards 18) in FIG. 3 is located closer to the source-side flexible circuit boards 23 and the printed circuit board 25 than the LED board 18 on the right in FIG. 3 (the other one of the LED boards 18). Therefore, the LED board 18 on the left is more likely to receive an influence of heat generated by the source-side flexible circuit boards 23 and the printed circuit board 25 (heat sources other than the light sources) when they are turned on (or driven). Namely, the LED board 18 on the left in FIG. 3 is located in a high temperature area HA (a heat source arrangement area in which heat sources other than the light sources are arranged). The high temperature area HA is an area of the backlight 12 in which the temperature tends to become higher than an area thereof in which the LED board 18 on the right in FIG. 3 is arranged (a low temperature area LA, a heat source non-arrangement area in which heat sources other than the light sources are not arranged). In the following description, the LED board 18 and the LEDs 17 mounted thereon arranged in the low temperature area LA are referred to as the first LED board and the first LEDs and indicated by symbols with letter A added to the numerals. The LED board 18 and the LEDs 17 mounted thereon arranged in the high temperature area HA are referred to as the second LED board and the second LEDs and indicated by symbols with letter B added to the numerals. When the LED boards 18 and the LEDs 17 are described without the above distinction, the letters are not added to the numerals.

As described above and illustrated in FIG. 3, in the backlight 12 according to this embodiment, the first LED board (the first light source) 18A and the second LED board (the second light source) 18B are arranged in the areas HA and LA, the temperature environments of which are different. Therefore, the following problems may occur. The second LEDs (the second unit light sources) 17B mounted on the second LED board 18B in the high temperature area HA tend to receive the influence of heat generated by the source-side flexible circuit boards 23 and the printed circuit board 25 more than the first LEDs (the first unit light sources) 17A mounted on the first LED board 18A in the low temperature area LA. Therefore, a life cycle of the second LEDs 17B may be shorter. Furthermore, because of the influence of heat generated by the source-side flexible circuit boards 23 and the printed circuit board 25, the temperature-brightness characteristics vary. As a result, the second LEDs 17B may turn on with different brightness from that of the first LEDs 17A. Because of the variation in temperature-brightness characteristics, the second LEDs 17B may turn on with different chromaticity from that of the first LEDs 17A. If the life cycle of the second LEDs 17B becomes shorter, a life cycle of the backlight 12 may become shorter, which may increase a frequency of repair (shorten a cycle of repair). If the brightness or the chromaticity is different between the first LEDs 17A and the second LEDs 17B, unevenness in brightness or chromaticity occurs among rays of the light emitted by the backlight 12.

Figure 7:
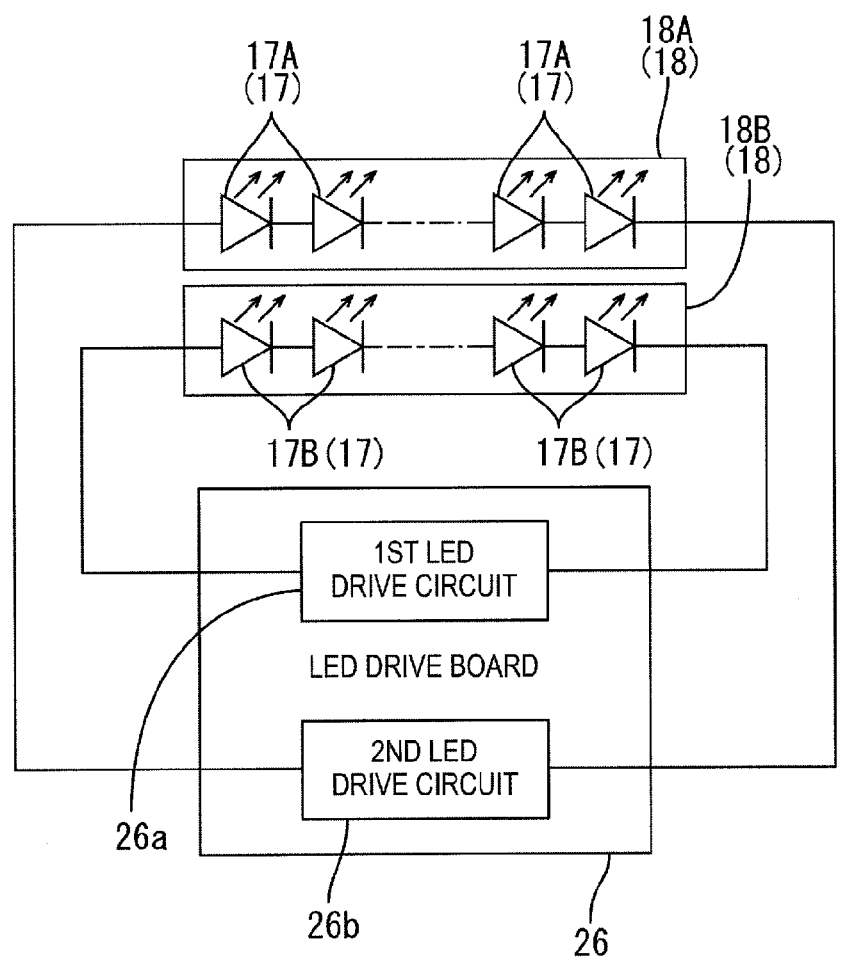
FIG. 7 is a block diagram illustrating an electrical configuration of a power supply circuit of the LED board.

The LED boards 18A and 18B in this embodiment are configured to receive different amounts of current from the LED drive board 26. The current supplied to the second LED board 18B is lower than the current supplied to the first LED board 18A. Specifically, as illustrated in FIG. 7, the LED drive board 26 includes a first LED drive circuit 26a and a second LED drive circuit board 26b. The first LED drive circuit 26a is configured to supply a current to the first LED board 18A. The second LED drive circuit 26b is configured to supply a current to the second LED board 18B. The LED drive circuit 26a and 26b include constant current circuits (not illustrated), respectively. The constant current circuits are configured to drive the LEDs 17A mounted on the LED board 18A and the LEDs 17B mounted on the LED board 18B with constant current, respectively. The current I2 supplied from the second LED drive circuit 26b to the second LED board (the second LEDs 17B) is lower than the current I1 supplied from the first LED drive circuit 26a to the first LED board (the first LEDs 17A). With this configuration, the amount of heat generated by the second LEDs 17B on the second LED board 18B in the high temperature area HA is smaller than the amount of heat generated by the first LEDs 17A on the first LED board 18A in the low temperature area LA. Therefore, the temperature environments of the first LEDs 17A and the second LED boards 18B can be equalized and problems resulting from temperature differences are less likely to occur.

Figure 8:
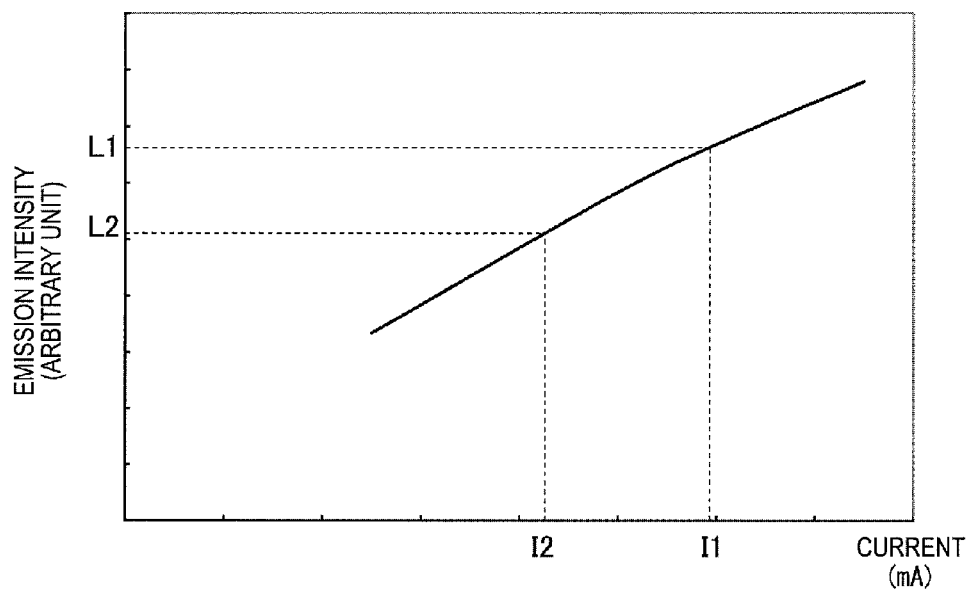
FIG. 8 is a graph illustrating current-brightness characteristics of an LED.

However, when the LED boards 18A and 18B are driven with different amounts of current, the following problem may occur. The current-brightness characteristics of the LEDs 17 in this embodiment are illustrated in FIG. 8. As the supplied current varies, the emission intensity, that is, the brightness (the amount of light emission) varies. The supplied current and the brightness are substantially proportional to each other. In FIG. 8, the horizontal axis indicates the current (in mA) supplied to the LEDs 17 and the vertical axis indicates the emission intensity (in arbitrary unit). Examples of the unit of the emission intensity include radiance ($W/sr \cdot m^2$), radiant flux (W), and irradiance ($W/m^2$). Other physical quantities related radiation can be used. The brightness of the first LEDs 17A on the first LED board 18A relative to the supplied current I1 is referred to as L1. The brightness of the second LEDs 17B on the second LED board 18B relative to the supplied current I2 is referred to as L2. The brightness L2 is lower than the brightness L1. The amounts of light transmitted from the LED boards 18A and 18B arranged at the respective ends of the light guide plate 19 with respect to the short-side direction to the light guide plate 19 are different from each other. Therefore, the amounts of light exiting from the light guide plate 19 through the light exiting surface 19a may not be even in a plane. A ratio of the brightness L2 to the brightness L1 is larger than a ratio of the current I2 to the current I1. Therefore, the current-brightness characteristics of the LED 17 in this embodiment are non-linear.

Figure 5:
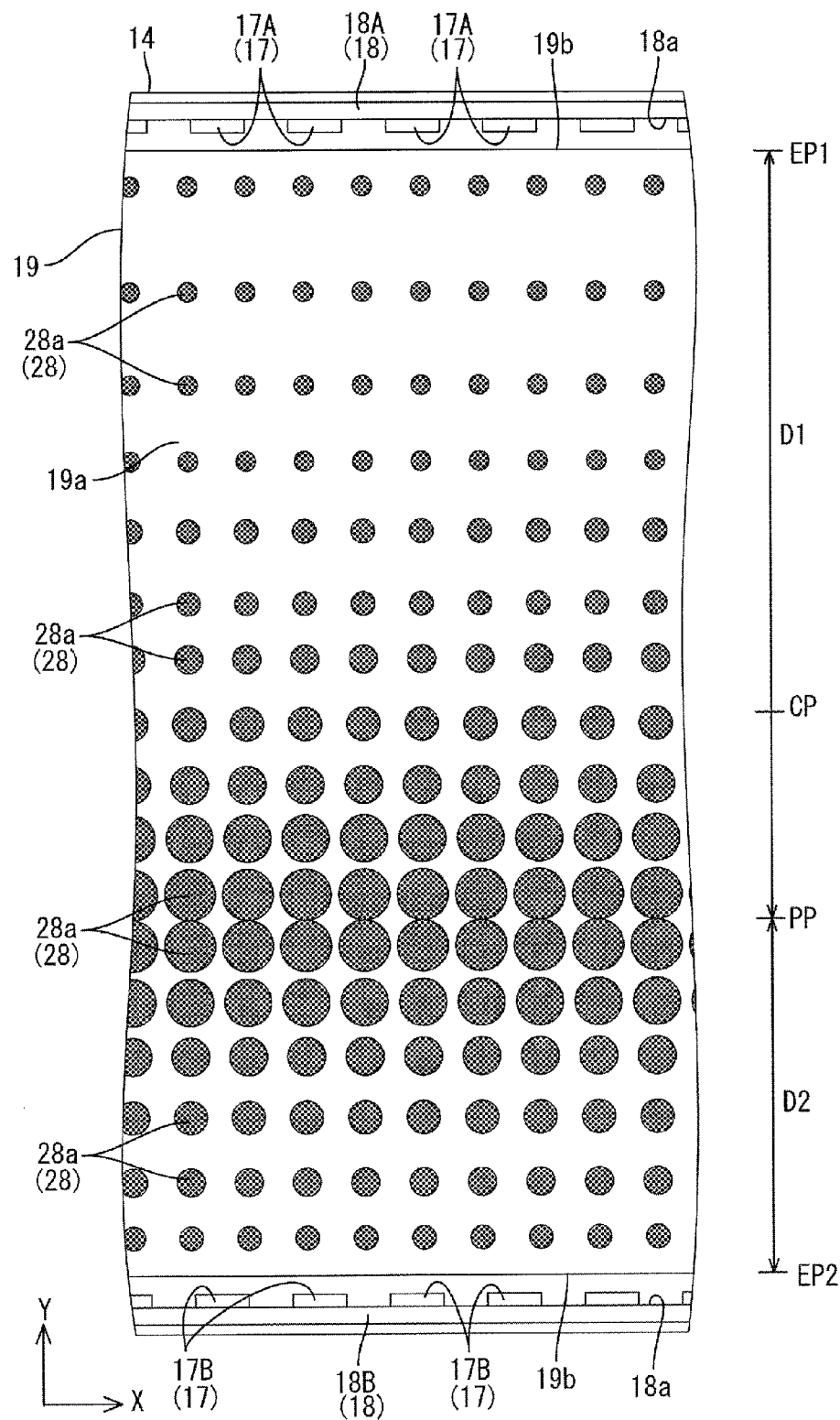
FIG. 5 is a magnified plan view of FIG. 4.

As illustrated in FIGS. 4 and 5, an area distribution of the light reflection portions 28 in a plane of the plate surface (the light exiting surface 19a, the plate surface 19c) of the light guide plate 19 becomes larger as a distances from the first LED board 18A or the second LED board 18B increases. The area distribution is the largest in an area close to the second LED board 18B. With this configuration, rays of light from the first LED board 18A, the amount of light emission of which is larger within the plane of the plate surface of the light guide plate 19, are less likely to be reflected by the light reflection portions 28. Rays of light from the second LED board 18B, the amount of light emission of which is smaller, are more likely to be reflected by the light reflection portions 28. Therefore, the amounts of the light exiting from the light guide plate 19 through the light exiting surface 19a in a plane can be equalized and thus uneven brightness is less likely to occur. The configuration of the light reflection portions 28 will be described in detail.

As illustrated in FIGS. 4 and 5, the light reflection portions 28 include a number of dots 28a formed with ink and dispersedly arranged with predetermined distribution within the plate surface 19c opposite from the light exiting surface 19a of the light guide plate 19. Areas and arrangement intervals of the dots 28a vary as a distance from the LED board 18A or 18B in the Y-axis direction (a direction along an optical axis of the LEDs 17 perpendicular to an arrangement direction of the LEDs 17) varies. Each dot 28a has a substantially round shape in a plan view. The dots 28a are arranged substantially in lines in the X-axis direction and the Y-axis direction at predetermined intervals in the plane of the light exiting surface 19a (the plate surface 19c). The areas of the dots 28a increase as the distance from the LED board 18A or 18B increases. The intervals of the dots 28a decrease as the distance from the LED board 18A or 18B increases.

Figure 9:
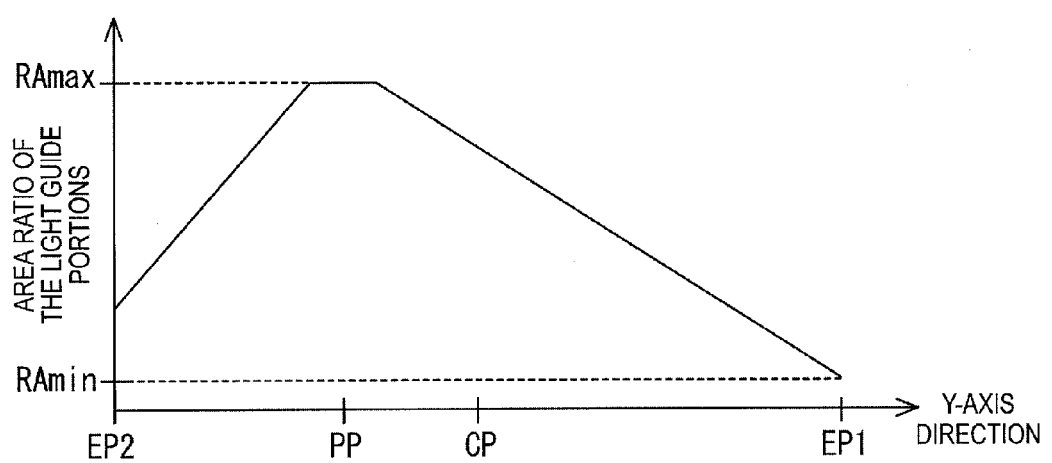
FIG. 9 is a graph illustrating variations in area of dots includes in a light reflection portion from a second end position EP2 of the light guide plate to a first edge point EP1 of the light guide plate.

Next, the area distribution of the light reflecting portions 28 in the plane of the plate surface (the light exiting surface 19a, the plate surface 19c) of the light guide plate 19 will be described in detail. As illustrated in FIG. 9, an area ratio of the light reflection portions 28 to unit area in the plane of the plate surface of the light guide plate 19 increases as a distance from an edge point EP1 or EP2 toward the middle of the light guide plate 19 in the short-side direction thereof (the Y-axis direction), that is, the distance from the LED board 18A or 18B increases. In FIG. 9, the horizontal axis indicates a position relative to the Y-axis direction, and the vertical axis indicates an area ratio of the light guide portions 28 per unit area in the plane of the plate surface of the light guide plate 19. The area ratio of the light reflection portions 28 does not take the maximum value RAmax at the middle point CP with respect to the short-side direction of the light guide plate 19. The area ratio of the light reflection portions 28 takes the maximum value RAmax at a point closer to the second LED board 18B than the middle point CP. The point is referred to as a peak point PP (the point at which the area takes the maximum value). The area ratio of the light reflection portions 28 at the first edge point (the first end) EP1 on the first LED board 18A side among the edge points EP1 and EP2 (ends including the light entrance surfaces 19b) is smaller than the area ratio at the second edge point (the second end) EP2 on the second LED board 18B side. The area ratio at that point takes the minimum value RAmin in the plane of the plate surface of the light guide plate 19. The area ratio of the light reflection portions 28 described above takes the minimum value RAmin at the first edge point EP1 of the light guide plate 19 on the first LED board 18A side and gradually increases from the middle point CP to the peak point PP. Then, the area ratio starts decreasing after the peak point PP and gradually decreases to the edge point EP2 on the second LED board 18B side. Namely, the area ratio changes such that the light reflection portions 28 vary with gradation. A variation in area ratio of the light reflection portion 28 (a gradient of the graph in FIG. 9) is relatively small (gentle) in a section between the first edge point EP1 and the peak point PP and relatively large (steep) in a section between the peak point PP and the second edge point EP2.

A total area of the light reflection portions 28 in the plane of the plate surface of the light guide plate 19 is as follows. Referring to FIG. 4, when an area of the light guide plate 19 is divided into an upper section and a lower section at the middle point CP, a total area of the light reflection portions 28 in the section closer to the second LED board 18B (the lower section in FIG. 4) is larger than a total area of the light reflection portions 28 in the section closer to the first LED board 18A (the upper section in FIG. 4). Therefore, rays of light transmitted from the first LED board 18A, the amount of light emission of which is relatively large, to the light guide plate 19 are less likely to be reflected by the light reflection portions 28 and to exit through the light exiting surface 19a in comparison to the other. A distance that the light travels through the light guide plate 19 is relatively large. Rays of light transmitted from the second LED board 18B, the amount of light emission of which is relatively small, to the light guide plate 19 are more likely to be reflected by the light reflection portions 28 and to exit through the light exiting surface 19a. A distance that the light travels through the light guide plate 19 is relatively small. With this configuration, the amounts of reflected light by the light reflection portions 28 are substantially equalized in the plane of the plate surface of the light guide plate 19. The amount of reflected light increases as a distance from the edge point EP1 or EP2 toward the middle point CP decreases and takes a peak at the middle point CP. The amount of reflected light by the light reflection portion has a correlation with the amount of exiting light from the light guide plate 19 through the light exiting surface 19a. Therefore, with the above configuration, unevenness brightness is less likely to occur among rays of the light emitted by the backlight 12.

A distance D1 is a distance from the peak point PP at which the area ratio of the light reflection portions 28 is the maximum to the edge point EP1 closer to the first LED board 18A (a distance from the peak point PP to the first LED board 18A). A distance D2 is a distance from the peak point PP to the edge point EP2 closer to the second LED board 18B (a distance from the peak point PP to the second LED board 18B). A ratio of the distance D1 to the distance D2 is about equal to a ratio of the current I1 supplied to the first LED board 18A by the first LED drive circuit 26a to the current I2 supplied to the second LED board 18B by the second LED drive circuit 26b as illustrated in FIGS. 5 and 8. With this configuration, if the ratio of the current I1 supplied from the LED drive circuit board 26 to the LED board 18A to the current I2 supplied from the LED drive circuit board 26 to the LED board 18B is defined in advance, the area distribution of the light reflection portions 28 (arrangement around the peak point PP) can be easily designed based on the ratio of the current I1 to the current I2. This provides high productivity and further reduces the cost. Furthermore, in comparison to a case that the light reflection portions 28 are designed based on a brightness ratio regarding light emissions of the LED boards 18A and 18B, the cost required for designing the light reflection portions 28 can be further reduced because it is not necessary to measure the brightness.

As illustrated in FIG. 4, the area ratio of the light reflection portions 28 to a unit area in the light exiting surface 19a with respect to the long-side direction of the light guide plate 19 (the X-axis direction, the arrangement direction of the LEDs 17) is substantially constant from one of the edges to the other, that is, does not vary.

This embodiment has the above-described configuration. The following description illustrates how it works. When the liquid crystal display device 10 is tuned on, various signals are transmitted from the control circuit board 27 to the liquid crystal panel 11 via the printed circuit board 25 and the flexible circuit boards 23 and 24 (the drivers DR) and the driving of the liquid crystal panel 11 is controlled. Furthermore, the driving power is supplied from the LED drive circuits 26a and 26b of the LED drive board 26 to the LED board 18A and 18B. As a result, the driving of the LEDs 17A and 17B mounted on the respective LED boards 18A and 18B is controlled. Rays of light from the LEDs 17A and 17B are directed to the light guide plate 19 and to the liquid crystal panel 11 via the optical member 15 to illuminate the liquid crystal panel 11. Specified images are displayed on the liquid crystal panel 11. The following description illustrates how the backlight 12 works in detail.

When the LEDs 17A and 17B are turned on, the rays of light are emitted by the LEDs 17A and 17B and directed to the respective light entrance surfaces 19b of the light guide plate 19 as illustrated in FIG. 3. Although spaces are provided between the LEDs 17 and the light entrance surfaces 19b, the spaces are located between the first reflection sheet 20 on the front side and the second reflection sheet 21 on the rear side. Therefore, the rays of light from the LEDs 17 are repeatedly reflected by the reflection sheets 20 and 21. With this configuration, the rays of light are efficiently directed to and enter the light entrance surface 19b. The rays of light that enter through the light entrance surface 19b are totally reflected off an interface between the light guide plate 19 and an external air layer or by the third reflection sheet 22. Furthermore, the rays of light are diffusely reflected by the light reflection portions 28 during travel through the light guide plate 19.

With this configuration, the incident angles of the rays of light to the light exiting surface 19a do not exceed the critical angle and thus more rays of light exit from the light exiting surface 19a.

The following description illustrates how the light reflection portions 28 work. As illustrated in FIGS. 5 and 9, the area ratio of the light reflection portions 28 to unit area in the plane of the plate surface of the light guide plate 19 (the light exiting surface 19a, the plate surface 19c) increases as the distance from the first LED board 18A or the second LED board 18B increases. The area ratio is defined such that the peak point PP at which the area ratio is the maximum is closer to the second LED board 18B. As illustrated in FIG. 5, the rays of light emitted by the first LEDs 17A on the first LED board 18A and entered the light guide plate 19 through the light entrance surface 19b at the first edge point EP1 are less likely to be reflected by the light reflection portions 28 and exit from the light exiting surface 19a in comparison to the other. Therefore, a distance for which the rays of light travel in the light guide plate 19 is relatively long. The rays of light emitted by the second LEDs 17B on the second LED board 18B and entered the light guide plate 19 through the light entrance surface 19b at the second edge point EP2 are more likely to be reflected by the light reflection portions 28 and exit from the light exiting surface 19a. Therefore, a distance for which the rays of light travel in the light guide plate 19 is relatively short. As illustrated in FIG. 8, a relatively large current I1 is supplied from the first LED drive circuit 26a to the first LED board 18A. Therefore, the amount of light emission of the first LEDs 17A is relatively large. A relatively small current I2 is supplied from the second LED drive circuit 26b to the second LED board 18B. Therefore, the amount of light emission of the second LEDs 17B is relatively small. The rays of light from the first LED board 18A, the amount of light emission of which is large, are less likely to be reflected by the light reflection portions 28 and exit. The rays of light from the second LED board 18B, the amount of light emission of which is small, are more likely to be reflected by the light reflection portions 28 and exit. With this configuration, the in-plane distribution of the amount of the light reflected by the light reflection portions 28 in the plane of the light exiting surface 19a of the light guide plate 19 and the in-plane distribution of the amount of light exiting from the light exiting surface 19a are equalized. As a result, the backlight 12 and the liquid crystal display device 10 are less likely to produce uneven brightness among the rays of light that exit therefrom.

When the liquid crystal display device 10 is turned on and power is supplied to electric components, heat is produced. As illustrated in FIGS. 2 and 3, the source-side flexible printed circuit boards 23 and the printed circuit board 25 for controlling the driving of the liquid crystal panel 11 are arranged only at the long side closer to the second LED board 18B in the liquid crystal display device 10. When the source-side flexible circuit boards 23 and the printed circuit board 25 are driven and start generating heat, the temperature in the area in which the second LED board 18B is arranged (the high temperature area HA) tends to become higher than the temperature in the area in which the first LED board 18A is arranged (the low temperature area LA). The amount of heat generated according to the amount of light emission of the second LED board 18B is smaller in comparison to the first LED board 18A to which the relatively large current I1 is supplied from the first LED board 18A because the relatively small current I2 is supplied from the second LED drive circuit 26b to the second LED board 18B. With this configuration, the temperature environments of the first LED board 18A and the second LED board 18B are equalized. Therefore, the life cycles of the LEDs 17A on the first LED board 18A and the LEDs 17B on the second LED board 18B are less likely to be shortened. Furthermore, the backlight 12 is less likely to produce uneven brightness or uneven chromaticity among the rays of light exiting therefrom. In the known technology, temperature environments are equalized by sparsely arranging light sources. In comparison to the known technology, the cost required for mounting the LEDs 17A and 17B can be reduced because the first LED board 18A and the second LED board 18B have the same configuration. Furthermore, differences in voltage applied to the LEDs 17A and 17B are smaller. Therefore, the cost required for the LED drive circuits 26a and 26b can be reduced, that is, this embodiment has an advantage in cost.

As described above, the backlight (a lighting device) 12 in this embodiment includes the first LED board (a first light source) 18A, the second LED board (a second light source) 18B, the light guide plate 19, the first LED drive circuit 26a and the second LED drive circuit 26b (a light source driving section), and the light reflection portions 28. The second LED board 18B is arranged opposite the first LED board 18A and in the high temperature area HA in which the temperature tends to become higher than the area in which the first LED board 18A is arranged. The light guide plate 19 is arranged between the first LED board 18A and the second LED board 18B. The light guide plate 19 includes a pair of end surfaces (the light entrance surfaces 19b) opposite the first LED board 18A and the second LED board 18B, respectively, and rays of light from the LED boards 18A and 18B enter thereto. The light guide plate 19 is configured such that the rays of light exit from the plate surface on the light exiting side (the light exiting surface 19a). The first LED drive circuit 26a and the second LED drive circuit 26b are configured to drive the first LED board 18A and the second LED board 18B, respectively, to supply a smaller current to the second LED board 18B than a current supplied to the first LED board 18A. The light reflection portions 28 are configured to reflect rays of light entered in the light guide plate 19 toward the light exiting side to increase the rays of light that exit from the plate surface on the light exiting side of the light guide plate 19. The light reflection portions 28 are arranged such that the area distribution thereof in the plane of the plane surface of the light guide plate 19 becomes larger as the distance from the first LED board 18A or the second LED board 18B increases. Furthermore, the light reflection portions 28 are arranged such that the point at which the area ratio of the light reflection portions 28 is the maximum (the peak point PP) is closer to the second LED board 18B.

With the above configuration, the rays of light from the first LED board 18A and the second LED board 18B enter into the light guide plate 19 through the end surfaces opposite the LED boards 18A and 18B, respectively. The rays of light are reflected by the light reflection portions 28 toward the light exiting side during the travel through the light guide plate 19 to increase the rays of light exiting from the plate surface on the light exiting side of the light guide plate 19. The first LED drive circuit 26a and the second LED drive circuit 26b are configured to supply the currents such the current smaller than the current supplied to the first LED board 18A is supplied to the second LED board 18B. Therefore, the amount of heat generated by the second LED board 18B is smaller than the amount of heat generated by the first LED board 18A. Because the second LED board 18B is arranged in the high temperature area HA in which the temperature tends to become higher than the area in which the first LED board 18A is arranged. By reducing the amount of heat generated by the second LED board 18B through the operation of the first LED drive circuit 26a and the second LED drive circuit 26b, the difference in temperature between the first LED board 18A and the second LED board 18B is maintained small. By supplying different amounts of currents from the first LED drive circuit 26a and the second LED drive circuit 26b to the LED boards 18A and 18B, respectively, the temperature environments of the LED boards 18A and 18B are equalized. In comparison to the known technology in which the light sources are sparsely arranged, the cost for mounting the light sources can be reduced. Furthermore, the difference in voltage applied to the LED boards 18A and 18B is reduced. Therefore, the cost required for the drive circuits can be reduced and thus this embodiment has an advantage in cost.

The amount of light emission of the second LED board 18B is controlled smaller than that of the first LED board 18A through the operation of the first LED drive circuit 26a and the second LED drive circuit 26b. Therefore, uneven brightness may occur among the rays of light that exit from the plate surface of the light guide plate 19. The light reflection portions 28 configured to reflect the rays of light in the light guide plate 19 toward the light exiting side have the following area distribution in the plane of the plate surface of the light guide plate 19. The area distribution increases as the distance from the first LED board 18A or the second LED board 18B increases. Furthermore, the point at which the area distribution is the maximum is closer to the second LED board 18B. The rays of light from the first LED board 18A, the amount of light emission of which is relatively large, are less likely to be reflected by the light reflection portions 28. The rays of light from the second LED board 18B, the amount of light emission of which is relatively small, are more likely to be reflected by the light reflection portions 28. With this configuration, the amounts of light exiting from the plate surface of the light guide plate 19 on the light exiting side are equalized in the plane. Therefore, the uneven brightness is less likely to occur. According to this embodiment, the temperature environments of the LED boards 18A and 18B are equalized while the cost and the uneven brightness are reduced.

The LEDs (unit light sources) 17 are arrange in lines along the respective end surfaces of the light guide plate 19 on the first LED board 18A and the second LED board 18B, respectively. The number and the intervals of the LEDs 17 on the first LED board 18A are equal to those on the second LED board 18B. Because the first LED board 18A and the second LED board 18B have the same configuration, the cost required for mounting the LED boards 18A and 18B can be reduced.

The area of the light reflection portions 28 at the end of the light guide plate 19 closer to the first LED board 18A (the first edge point EP1) is smaller than the area of the light reflection portions 28 at the end closer to the second LED board 18B (the second edge point EP2). With this configuration, the rays of light from the first LED board 18A, the amount of light emission of which is relatively large, are less likely to be reflected by the light reflection portions 28 at the end of the light guide plate 19 closer to the first LED board 18A. Furthermore, the rays of light from the second LED board 18B, the amount of light emission of which is relatively small, are more likely to be reflected by the light reflection portions 28 at the end closer to the second LED board 18B. With this configuration, the differences in amount of emitted light between the ends of the light guide plate 19 closer to the first LED board 18A and the second LED board 18B, respectively, are less likely to be produced. Therefore, uneven brightness can be adequately reduced.

The light reflection portions 28 include a number of dots 28a dispersedly arranged on the plate surface of the light guide plate 19 opposite from the plate surface on the light exiting side. According to the configuration in which the light reflection portions 28 are provided with the dots 28a, the reflectivity can be adjusted by modifying dot patterns (e.g., number, area, intervals). This configuration has an advantage in providing even brightness.

The distance D1 is a distance from the peak point PP at which the area ratio of the light reflection portions 28 is the maximum to the edge point EP1 closer to the first LED board 18A. The distance D2 is a distance from the peak point PP to the edge point EP2 closer to the second LED board 18B. The ratio of the distance D1 to the distance D2 is about equal to a ratio of the current I1 supplied to the first LED board 18A by the first LED drive circuit 26a to the current I2 supplied to the second LED board 18B by the second LED drive circuit 26b. With this configuration, the area distribution of the light reflection portions 28 can be easily designed based on the ratio of the current I1 to the current I2 supplied from the first LED drive circuit 26a and the second LED drive circuit 26b to the LED boards 18A and 18B, respectively. This provides high productivity and further reduces the cost. Furthermore, in comparison to the case that the light reflection portions 28 are designed based on a brightness ratio regarding light emissions of the LED boards 18A and 18B, the cost required for designing the light reflection portions 28 can be further reduced because it is not necessary to measure the brightness.

The liquid crystal display device (a display device) 10 according to this embodiment includes the backlight 12 described above and the liquid crystal panel (a display panel) 11 configured to display images using the light from the backlight 12. According to the liquid crystal display device 10, the backlight 12 that provides light for the liquid crystal panel 11 is less likely to produce uneven brightness. Therefore, the liquid crystal display device 10 can perform high quality image display.

The liquid crystal display device 10 further includes the source-side flexible circuit boards 23 and the printed circuit board 25 (a panel driver) arranged closer to the second LED board 18B. The source-side flexible circuit boards 23 and the printed circuit board 25 are connected to the liquid crystal panel 11 and the configured to drive the liquid crystal panel 11. The source-side flexible circuit boards 23 and the printed circuit board 25 generate heat during the driving of the liquid crystal panel 11. The source-side flexible circuit boards 23 and the printed circuit board 25 are arranged closer to the second LED board 18B. The second LED board 18B is arranged in the high temperature area HA in which the temperature tends to become higher than in the area in which the first LED board 18A is arranged. The first LED drive circuit 26a and the second LED drive circuit 26b supply the currents such the current smaller than the current supplied to the first LED board 18A is supplied to the second LED board 18B. Therefore, the amount of heat generated by the second LED board 18B is maintained small and thus the difference in temperature between the first LED board 18A and the second LED board 18B can be compensated.

The first embodiment of the technology is described above. However, the technology is not limited to the above embodiment. For example, the following modifications may be included in the scope of the technology. In the following modifications, the same components as those in the above embodiment will be denoted by the same symbols and not be illustrated or described.

First Modification of First Embodiment

A first modification of the first embodiment will be described with reference to FIGS. 10 and 11. This modification includes light reflection portions 28-1 designed differently from the first embodiment.

Figure 10:
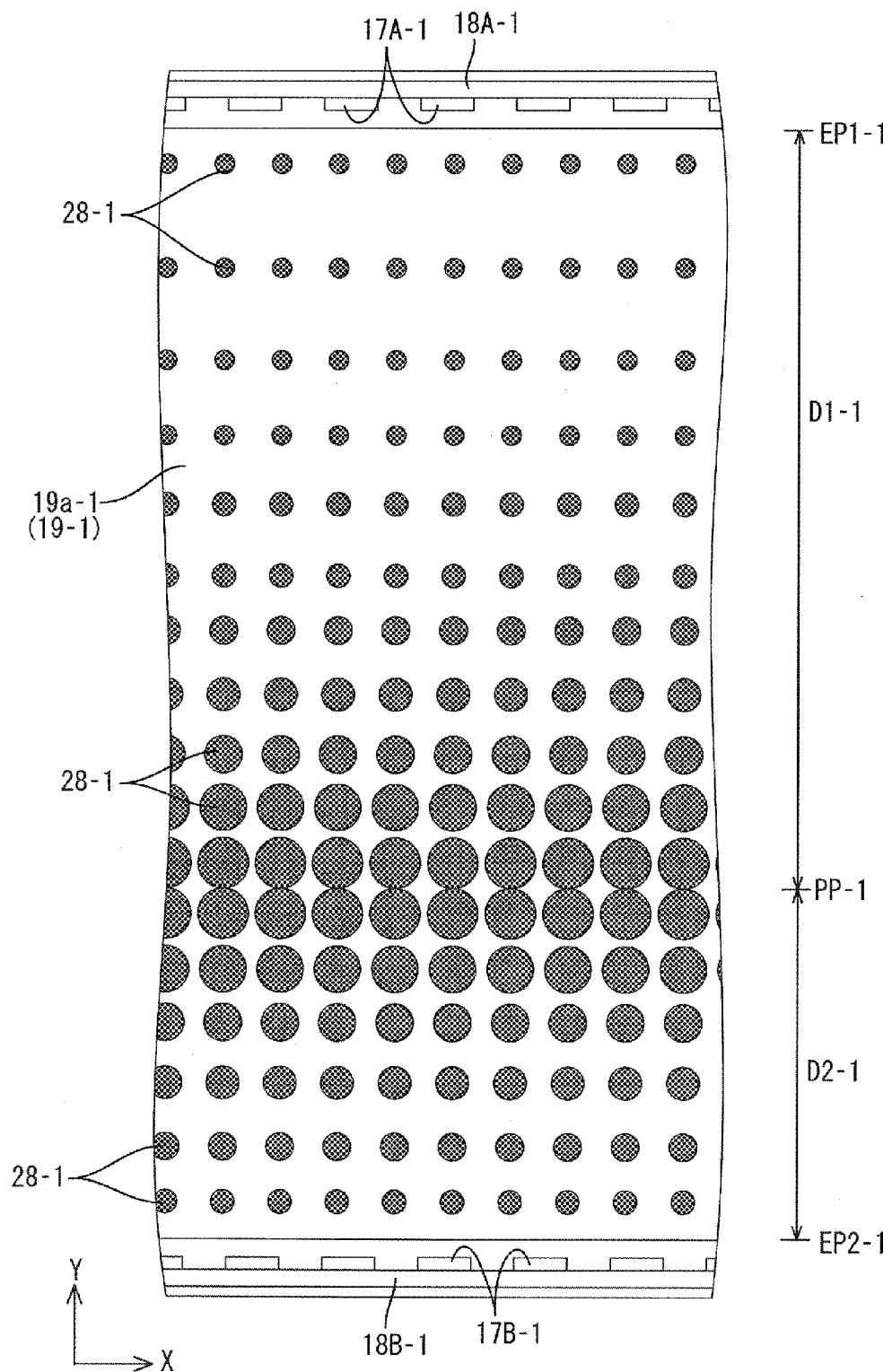
FIG. 10 is a magnified play view illustrating an arrangement of a light guide plate and an LED board of a first modification of the first embodiment of the technology.
Figure 11:
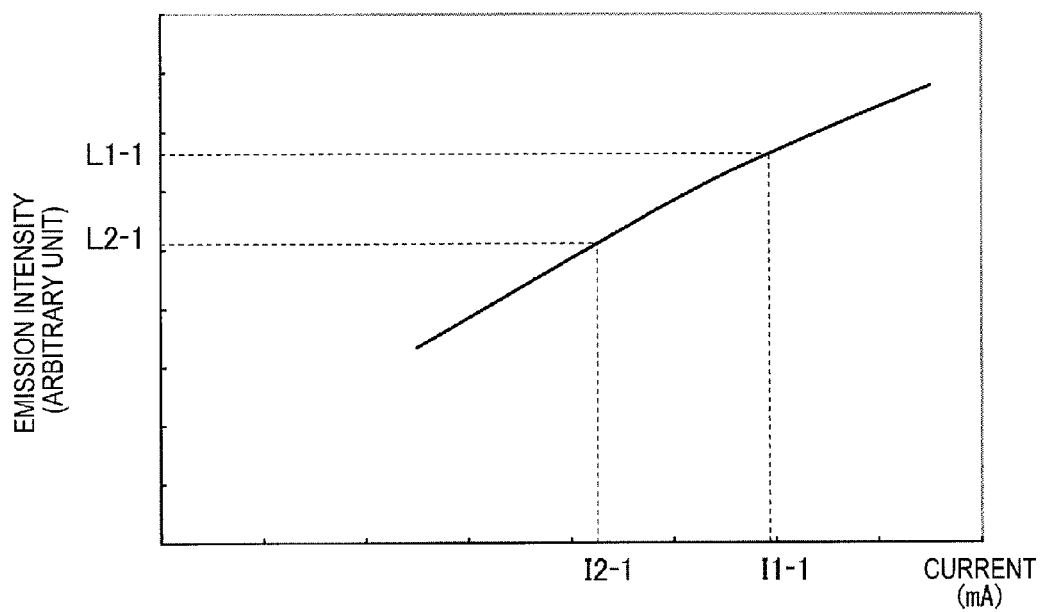
FIG. 11 is a graph illustrating current-brightness characteristics of an LED.

As illustrated in FIGS. 10 and 11, the light reflection portions 28-1 of this modification are designed as follows. A distance D1-1 is a distance from a peak point PP-1 at which an area ratio of the light reflection portions 28-1 is the maximum to an edge point EP1-1 closer to a first LED board 18A-1. A distance D2-1 is a distance from the peak point PP-1 to an edge point EP2-1 closer to a second LED board 18B-1. A ratio of the distance D1-1 to the distance D2-1 is about equal to a ratio of the brightness level L1-1 of emitted light from the first LED board 18A-1 to the brightness level L2-1 of emitted light from the second LED board 18B-1. The brightness levels L1-1 and L2-1 of light emitted by LEDs 17A-1 and 17B-1 on the respective LED boards 18A-1 and 18B-1 may be measured in advance or determined based on currents I1-1 and I2-1 supplied to the respective LED boards 18A-1 and 18B-1 using a current-brightness characteristic curve of the LEDs 17A-1 and 17B-1 illustrated in FIG. 11. The area distribution of the light reflection portions 28-1 can be easily designed (a location of the peak point PP-1 can be easily determined). This provides high productivity and further reduces the cost. Regarding the current-brightness characteristics of the LEDs 17A-1 and 17B-1, a ratio between currents supplied to the LEDs 17A-1 and 17B-1 and a ratio between brightness levels of light emitted by the LEDs 17A-1 and 17B-1 are not equal. However, the light reflection portions 28-1 are designed based on the brightness levels of the light emitted by the LEDs 17A-1 and 17B-1. In comparison to the first embodiment including the light reflection portions 28 designed based on the ratio of the current I1 supplied to the LEDs 17A to the current I2 supplied to the LEDs 17B, the differences in light emission between the LEDs 17A-1 and 17B-1 can be more properly compensated. Therefore, unevenness is further less likely to occur in the brightness levels of rays of light exiting from the light exiting surface of the light guide plate 19-1.

As described above, in this modification, the distance D1-1 is the distance from the peak point PP-1 at which the area ratio of the light reflection portions 28-1 is the maximum to the edge point EP1-1 closer to the first LED board 18A-1. The distance D2-1 is the distance from the peak point PP-1 to the edge point EP2-1 closer to the second LED board 18B-1. The ratio of the distance D1-1 to the distance D2-1 is about equal to the ratio of the brightness level L1-1 of emitted light from the first LED board 18A-1 to the brightness level L2-1 of emitted light from the second LED board 18B-1. With this configuration, the light reflection portions 28-1 can be easily designed based on the ratio of the brightness level L1-1 to the brightness level L2-1 regarding the emitted light from the LED boards 18A-1 and 18B-1. This provides high productivity and further reduces the cost. Regarding the current-brightness characteristics of the LEDs 17A-1 and 17B-1, the ratio between currents supplied to the LEDs 17A-1 and 17B-1 and the ratio between the brightness levels of light emitted by the LEDs 17A-1 and 17B-1 may not be equal. However, the light reflection portions 28-1 are designed based on the brightness levels of the light emitted by the LEDs 17A-1 and 17B-1. In comparison to the case that the light reflection portions 28 are designed based on the ratio of the current I1 supplied to the LEDs 17A to the current I2 supplied to the LEDs 17B, the difference in light emission between the LED boards 18A-1 and 18B-1 can be more properly compensated. Therefore, unevenness is further less likely to occur in the brightness levels of rays of light exiting from the light exiting surface of the light guide plate 19-1.

Second Modification of First Embodiment

A second modification of the first embodiment will be described with reference to FIG. 12. This embodiment includes light reflection portions 28-2 having different area distribution from the first embodiment.

Figure 12:
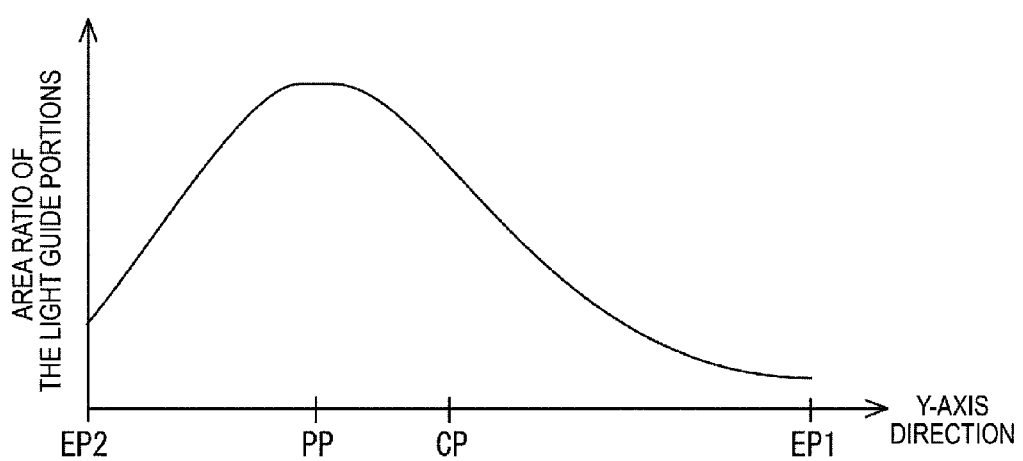
FIG. 12 is a graph illustrating variations in area of dots includes in a light reflection portion from a second end position EP2 of the light guide plate to a first edge point EP1 of the light guide plate according to a second modification of the first embodiment of the technology.

As illustrated in FIG. 12, an area ratio of the light reflection portions 28-2 in this modification to unit area in a plane of a plate surface of a light guide plate varies in a curve according to a distance from LED boards.

Third Modification of First Embodiment

A third modification of the first embodiment will be described with reference to FIG. 13. This embodiment includes light reflection portions 28-3 having different area distribution from the first embodiment.

Figure 13:
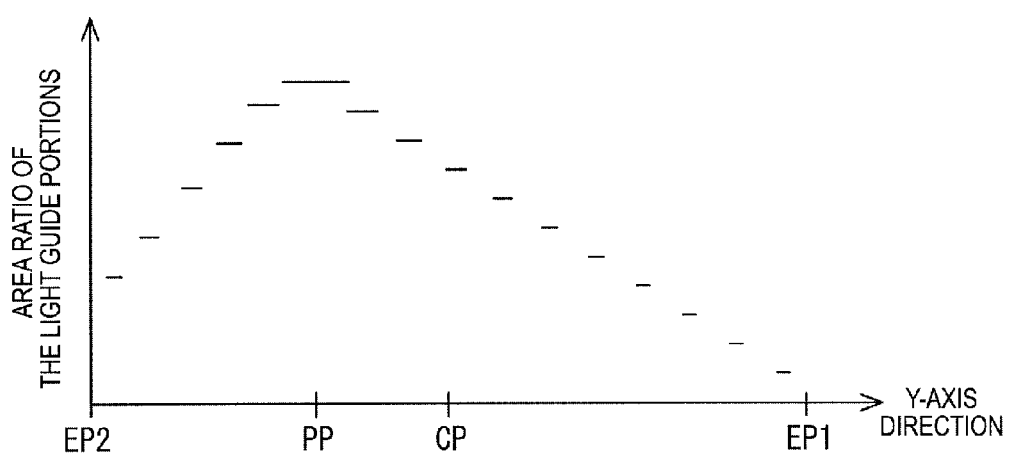
FIG. 13 is a graph illustrating variations in area of dots includes in a light reflection portion from a second end position EP2 of the light guide plate to a first edge point EP1 of the light guide plate according to a third modification of the first embodiment of the technology.

As illustrated in FIG. 13, an area ratio of the light reflection portions 28-3 in this modification to unit area in a plane of a plate surface of a light guide plate varies in the form of segments according to a distance from LED boards. Specifically, the area ratio increases stepwise as the distance from the LED boards increases.

Second Embodiment

A second embodiment of the technology will be described with reference to FIGS. 14 to 16. This embodiment includes an LED drive circuit board 126 and a control circuit board 127 arranged differently from the first embodiment. The same configurations, functions, and effects as those in the first embodiment will not be described.

Figure 14:
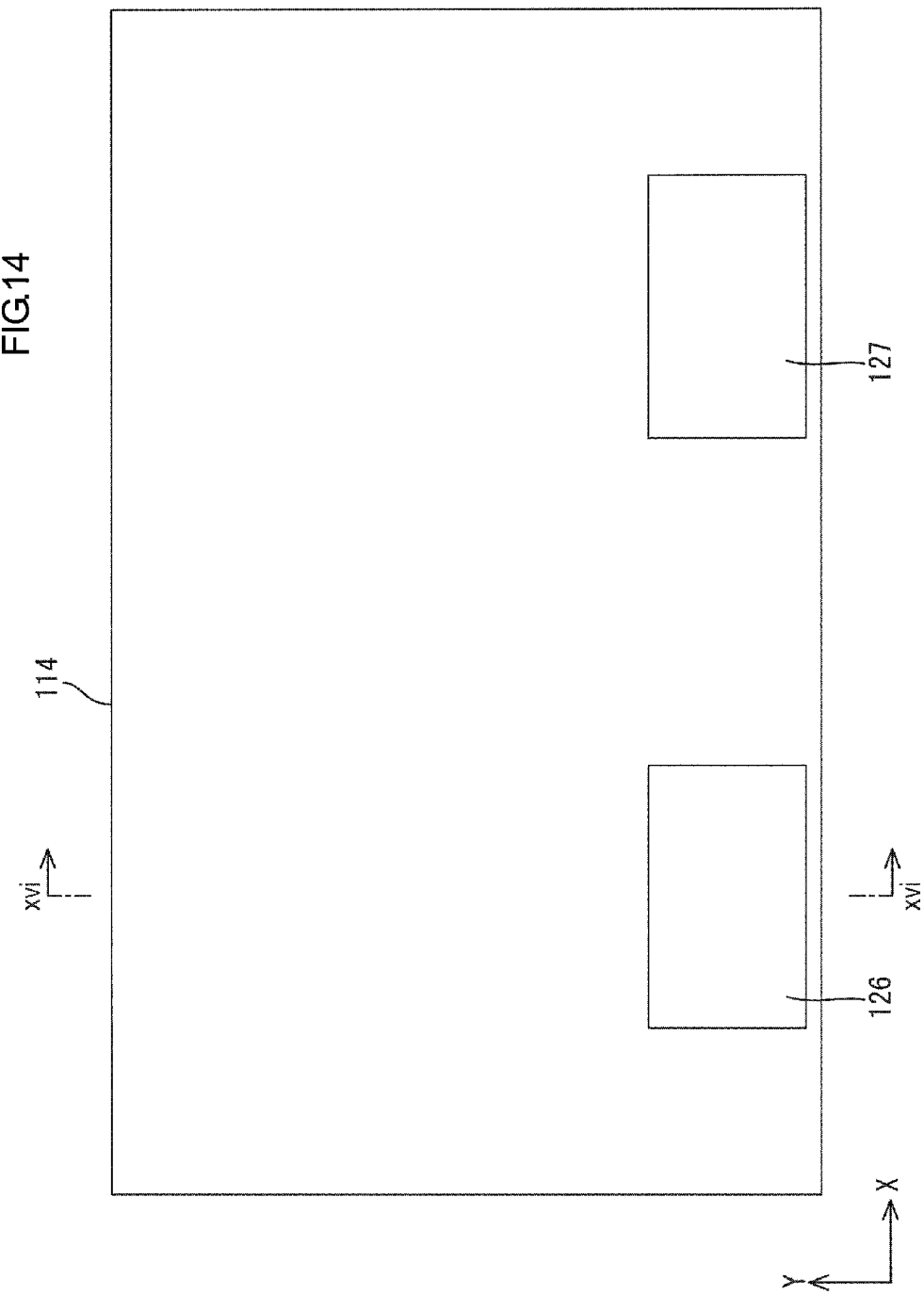
FIG. 14 is a rear view illustrating an arrangement of the chassis, an LED drive circuit board, and a control circuit board according to a second embodiment of the technology.
Figure 15:
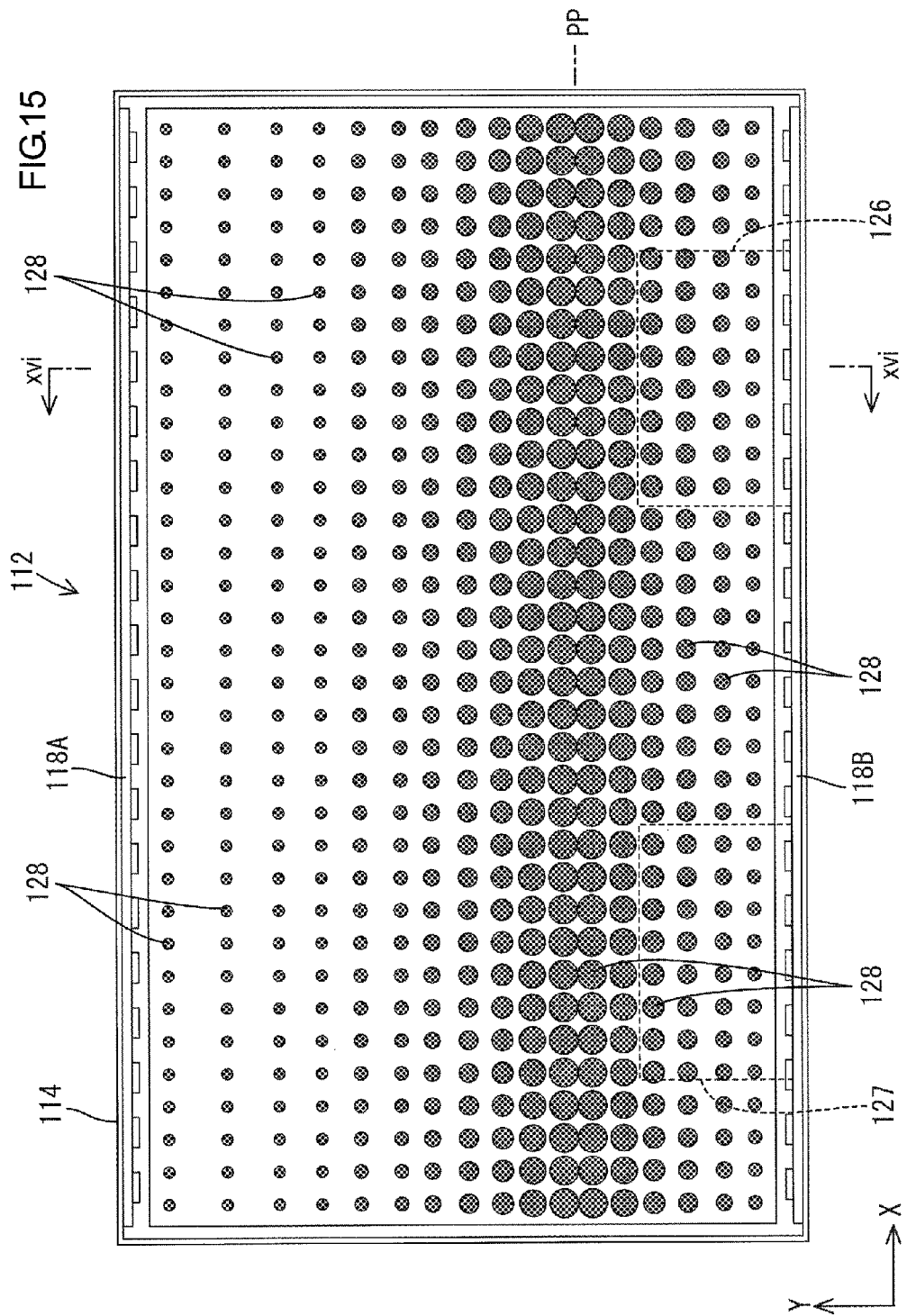
FIG. 15 is a plan view illustrating an arrangement of a chassis, a light guide plate, and an LED board.
Figure 16:
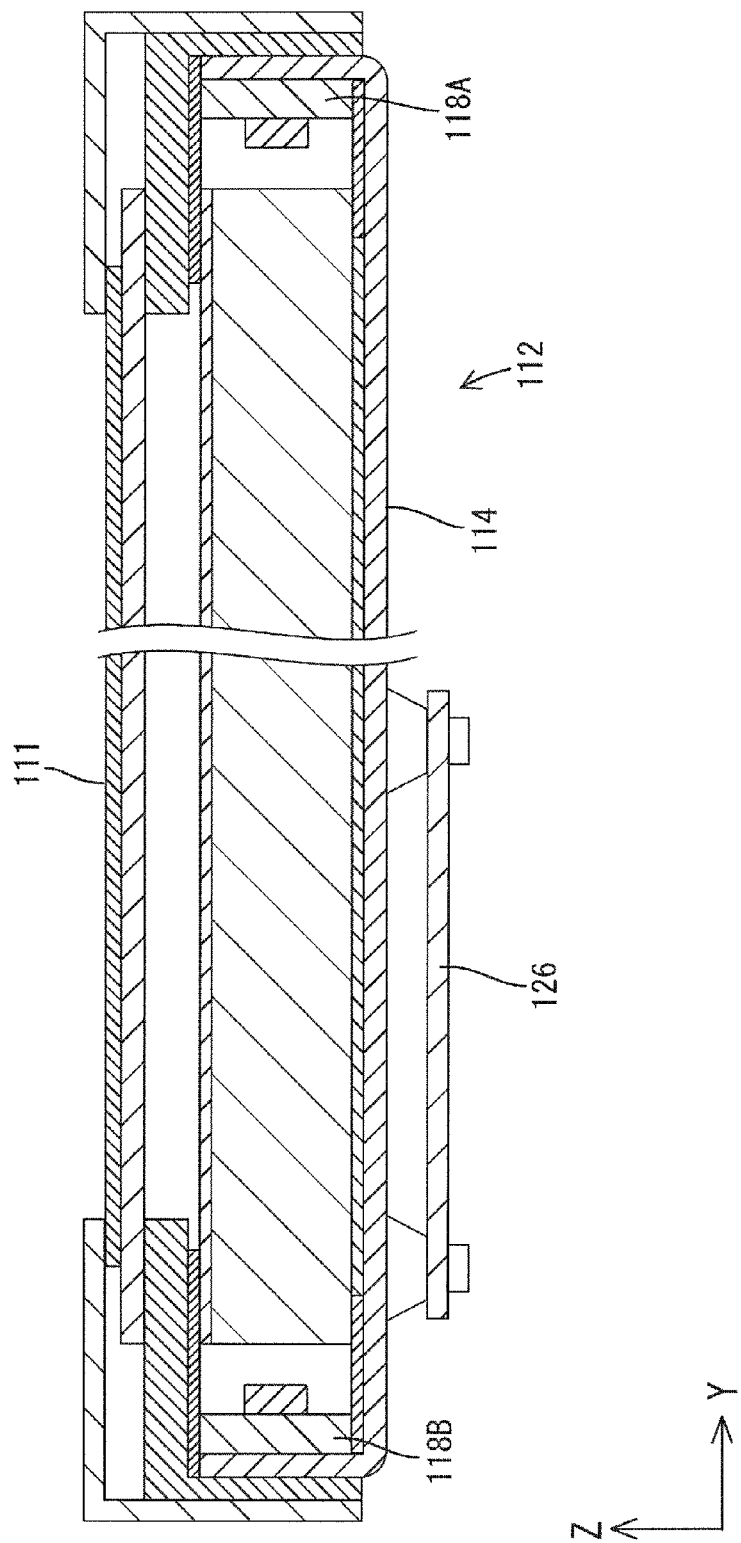
FIG. 16 is a cross-sectional view of FIGS. 14 and 15 along line xvi-xvi.

As illustrated in FIGS. 14 to 16, the LED drive circuit board 126 and the control circuit board 127 are arranged close to one of ends of a chassis 114 with respect to the short side thereof (the Y-axis direction), specifically, closer to a second LED board 118B. The LED drive circuit board 126 and the control circuit board 127 are both heat sources that generate heat when currents are supplied thereto. The second LED board 118B is more likely to be affected by heat generated by the LED drive circuit board 126 and the control circuit board 127 than the first LED board 118A. Similarly to the first embodiment, a current supplied to the second LED board 118B is smaller than a current supplied to the first LED board 118A. Furthermore, light reflection portions 128 are arranged such that the peak point PP at which the area takes the maximum value is closer to the second LED board 118B. Even the LED drive circuit board 126 and the control circuit board 127 are arranged as described above, temperature environments of the LED boards 118A and 118B can be equalized and development of uneven brightness can reduced while a cost is maintained low. This embodiment does not include the source-side flexible circuit boards 23 and the printed circuit board 25 (see FIG. 3) included in the first embodiment and which are heat sources. The gate-side flexible circuit boards 24 (see FIG. 2) are connected to the control circuit board 127 via a printed circuit board, which is not illustrated. With this configuration, the gate-side flexible circuit boards 24 have the same functions as those of the source-side flexible circuit boards 23 and the printed circuit board 25.

As described above, this embodiment includes the chassis 114 and the LED drive circuit board (a light source drive circuit board) 126. The chassis 114 holds the first LED board 118A, the second LED board 118B, and the light guide plate 119 therein. The LED drive circuit board 126 includes the first LED drive circuit and the second LED drive circuit. The LED drive circuit board 126 is mounted to the chassis 114 on an opposite side from the light exiting side and closer to the second LED board 118B. The LED drive circuit board 126 (a first LED drive circuit and a second LED drive circuit) generates heat when the LED boards 118A and 118B are driven.

The LED drive circuit board 126 is mounted to the chassis 114 on an opposite side from the light exiting side and closer to the second LED board 118B. Namely, the second LED board 118B is arranged in a high temperature area HA in which a temperature tends to become higher than an area in which the first LED board 118A is arranged. Even so, a current smaller than a current supplied to the first LED board 118A is supplied to the second LED board 118B and thus the amount heat generated by the second LED board 118B is maintained small. With this configuration, difference in temperature between the first LED board 118A and the second LED board 118B can be compensated.

Furthermore, a backlight 112 includes the chassis 114 configured to hole the first LED board 118A, the second LED board 118B, and the light guide plate 119 therein. The backlight 112 further includes the control circuit board (a panel drive control circuit board) 127 connected to the gate-side flexible circuit boards and configured to control of the driving of the gate-side flexible circuit boards. The control circuit board 127 is mounted to the chassis 114 on the opposite side from the light exiting side. The control circuit board 127 is arranged closer to the second LED board 118B. The control circuit board 128 generates heat while controlling the driving of the gate-side flexible circuit boards. The control circuit board 127 is mounted to the chassis 114 on the opposite side from the light exiting side and arranged closer to the second LED board 118B. The second LED board 118B is arranged in the high temperature area HA in which the temperature tends to become higher than the area in which the first LED board 118A is arranged. Even so, the current smaller than the current supplied to the first LED board 118A is supplied to the second LED board 118B and thus the amount of heat generated by the second LED board 118B is maintained small. With this configuration, the difference in temperature between the first LED board 118A and the second LED board 118B can be compensated.

Third Embodiment

A third embodiment of the technology will be described with reference to FIG. 17. The third embodiment includes LED boards 218A and 218B, arrangement of which relative to a light guide plate 210 is different from the first embodiment. The same configurations, functions, and effects as those in the first embodiment will not be described.

Figure 17:
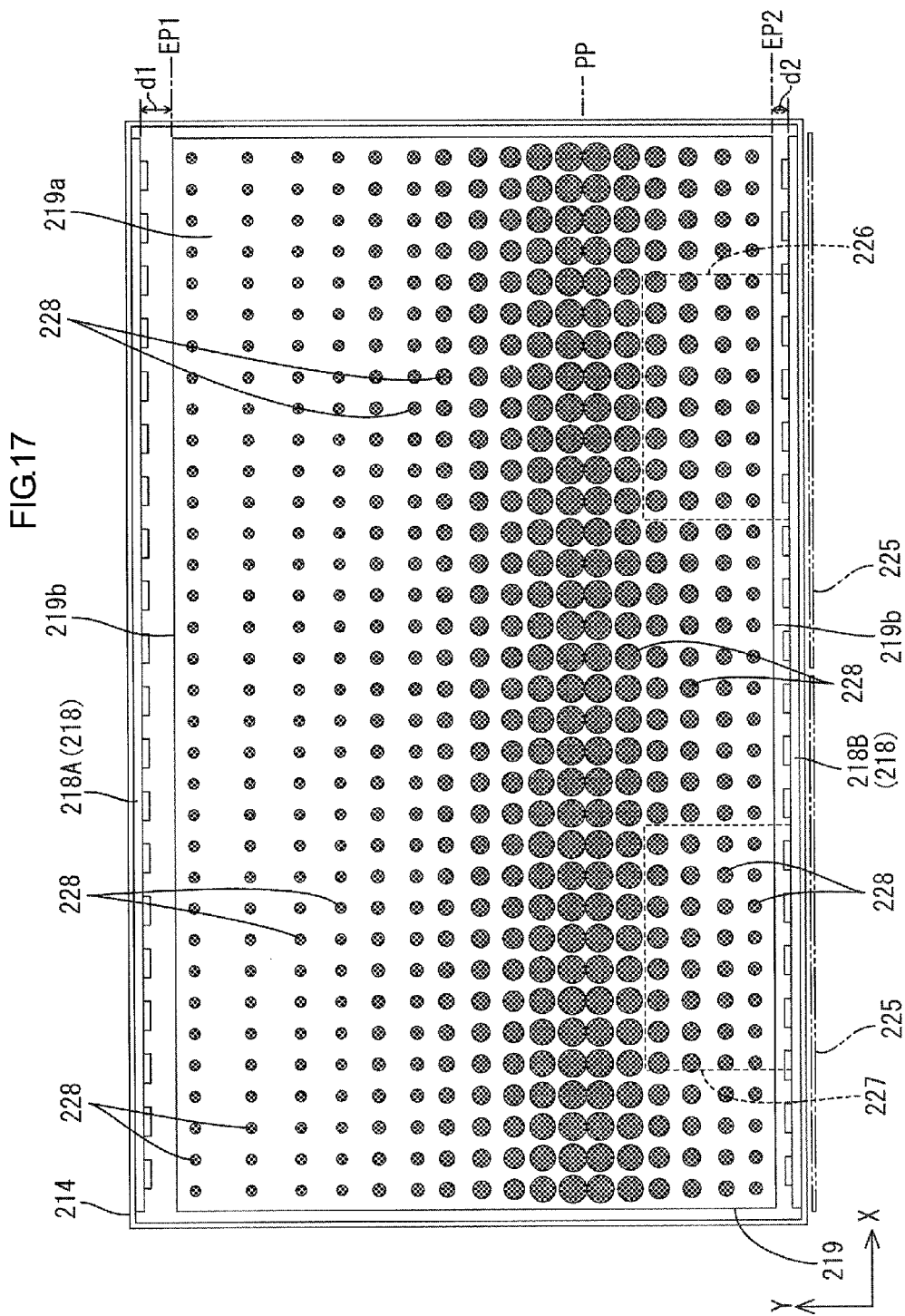
FIG. 17 is a plan view illustrating an arrangement of a chassis, a light guide plate, and an LED board according to a third embodiment of the technology.

As illustrated in FIG. 17, in this embodiment, an LED drive circuit board 226 and a control circuit board 227 are arranged close to one of ends of the chassis 214 with respect to the short side thereof (the Y-axis direction), specifically, closer to the second LED board 218B. Arrangement of the LED drive circuit board 226 and the control circuit board 227 is similar to the second embodiment. Source-side flexible circuit boards (not illustrated) and a printed circuit board 225 are different heat sources from the LED drive circuit board 226 and the control circuit board 227. The source-side flexible printed circuit boards and the printed circuit board 225 are arranged closer to the second LED board 218B similarly to the first embodiment. The second LED board 218B is affected by not only the heat generated by the LED drive circuit board 226 and the control circuit board 227 but also the heat generated by the source-side flexible circuit board and the printed circuit board 225. In comparison to the first and the second embodiments described above, a difference in temperature between the first LED board 218A and the second LED board 218B tends to become larger. If the difference in temperature between the LED boards 218A and 218B becomes larger, a difference in current supplied to the LEDs 218A and 218B needs to be increased. Furthermore, the light reflection portions 228 need to be designed such that the peak point PP at which the area ratio is the maximum is more closer to the second LED board 218B (the second edge point EP2). However, there are some limitations for such controls.

In this embodiment, as illustrated in FIG. 17, a positional relationship between the LED board 218A and the light guide plate 219 is different from a positional relationship between the LED board 218B and the light guide plate 219. A distance between the first LED board 218A and a light entrance surface 219b of the light guide plate 219 opposite the first LED board 218A is referred to as a distance d1. A distance between the second LED board 218B and a light entrance surface 219b of the light guide plate 219 opposite the second LED board 218B is referred to as a distance d2. The distance d1 and the distance d2 are defined such that the distance d1 is larger than the distance d2. As a distance between the LED board 218 and the light entrance surface 219b decreases, the incident efficiency tends to increase. As the distance between the LED board 218 and the light entrance surface 219b increases, the incident efficiency tends to decrease. Namely, the distance and the incident efficiency tend to have an inverse relationship. Even in the case that the difference in current supplied to the LED boards 218A and 218B is increased to equalize the temperature environments, rays of light from the first LED board 218A, the amount of light emission of which is larger, are less likely to enter the light entrance surface 219b. On the other hand, rays of light from the second LED board 218B, the amount of light emission of which is smaller, are more likely to be efficiently directed to and enter the light entrance surface 219b. With this configuration and the uneven area distribution of the light reflection portions 228, uneven brightness is further less likely to occur among the rays of light that exit from the light guide plate 219 in the plane of the light exiting surface 219a of the light guide plate 219. Even if the difference in current supplied to the LED boards 218A and 218B becomes so large that the uneven brightness cannot be reduced with the uneven area distribution of the light reflection portions 228, the uneven brightness can be reduced through the combination of the uneven area distribution configuration and the above-described configuration in which the positional relationship between the light guide plate 219 and the LED board 218A and the positional relationship between the light guide plate 219 and the LED board 218B are different. If uneven area distribution of the light reflection portions is not present (i.e., the peak point is at the middle of the light guide plate), a larger difference is required for the positional relationships between the light guide plate and the LED boards. In this case, the backlight may be increased in size (with a wider frame). This embodiment uses the combination of the uneven area distribution configuration and the configuration in which the positional relationship of the LED boards 218A and 218B are different. Therefore, such a problem is less likely to occur.

As described above, in this embodiment, the distance between the first LED board 218A and one of end surfaces of the light guide plate 219 is referred to as the distance d1. The distance between the second LED board 218B and the other end surface of the light guide plate 219 is referred to as the distance d2. The distances d1 and d2 are defined such that the distance d1 is larger than the distance d2. The incident efficiency tend to be inversely proportional to the distance d1 or d2, which is a distance between the LED board 218A and the end surface or between the LED board 218B and the end surface. When the distance d1 between the first LED board 218A and one of the end surfaces of the light guide plate 219 is defined relatively large, the rays of light from the first LED board 218A, the amount of light emission of which is larger, are less likely to enter the end surface of the light guide plate 219. When the distance d2 between the second LED board 218B and the other end surface of the light guide plate 219 is defined relatively small, the rays of light from the second LED board 218B, the amount of light emission of which is smaller, are more likely to be efficiently directed to and enter the end surface of the light guide plate 219. With this configuration and the configuration of the light reflection portions 228, uneven brightness is further less likely to occur. Even if the difference in current supplied from the LED drive circuit board 226 (a first LED drive circuit board and a second LED drive circuit board) to the LED boards 218A and 218B becomes so large that the uneven brightness cannot be reduced with the uneven area distribution of the light reflection portions 228, the uneven brightness can be reduced through the configuration in which the distance d1 between the LED board 218A and the end surface of the light guide plate 219 and the distance d2 between the LED board 218B and the end surface of the light guide plate 219 are different.

Fourth Embodiment

A fourth embodiment of the technology will be described with reference to FIG. 18. The fourth embodiment includes LED boards 318 in different number from the first embodiment. The same configurations, functions, and effects as those in the first embodiment will not be described.

Figure 18:
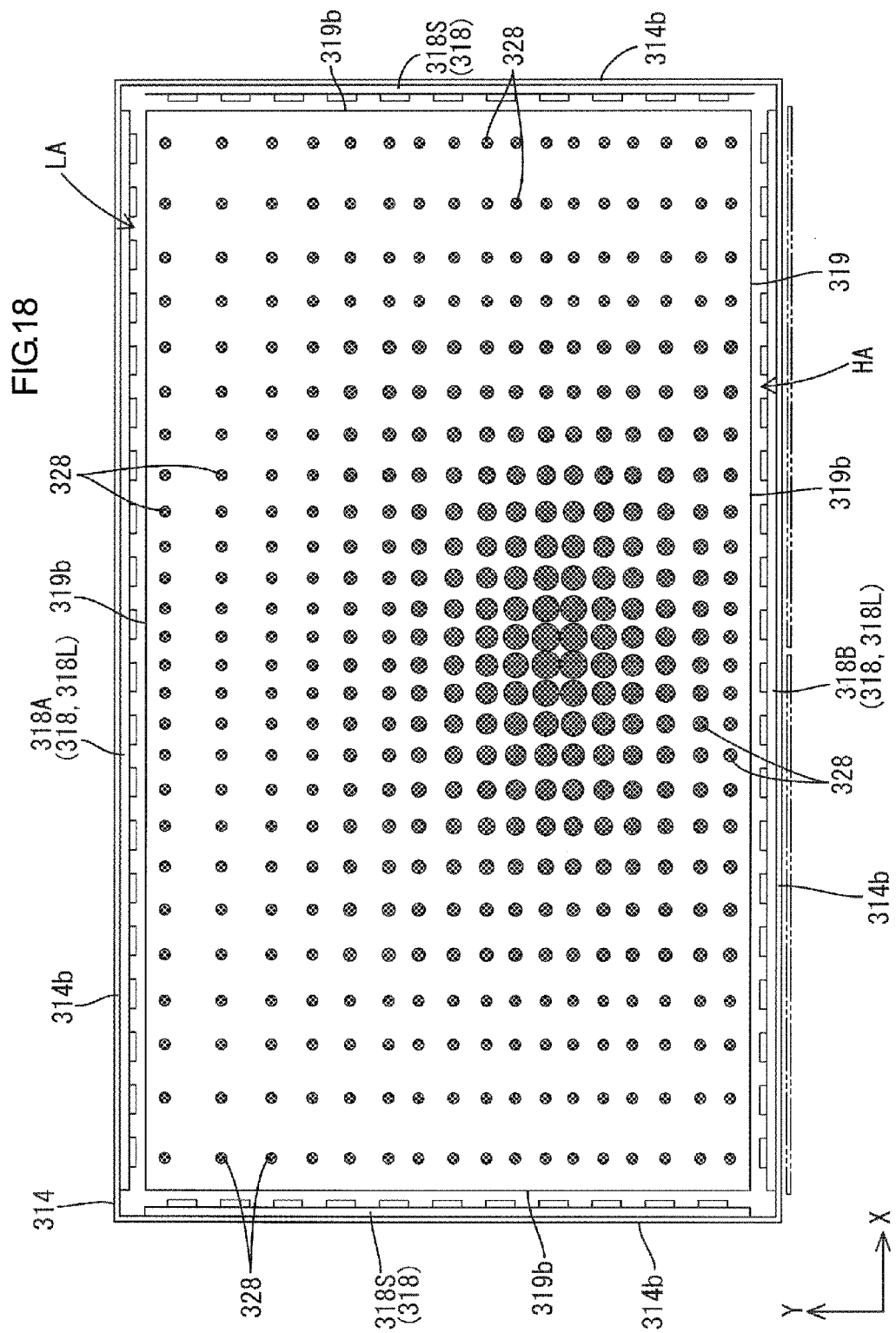
FIG. 18 is a plan view illustrating an arrangement of a chassis, a light guide plate, and an LED board according to a fourth embodiment of the technology.

As illustrated in FIG. 18, four LED boards 318 of this embodiment are arranged around a light guide plate 319 having a rectangular shape in a plan view. Specifically, the LED boards 318 include a pair of short-side LED boards 318S and a pair of long-side LED boards 318L. The short-side LED boards 318S sandwich the light guide plate 319 from sides in the long-side direction (the X-axis direction). The long-side LED boards 318L sandwich the light guide plate 319 from sides in the short-side direction (the Y-axis direction). The long-side LED boards 318L include a first LED board 318A arranged in a low temperature area LA in which a temperature is relatively low and a second LED board 318B arranged in a high temperature area HA in which a temperature is relatively high. The long-side LED boards 318L are mounted to long side boards 314b of the chassis 314, respectively. The short-side LED boards 318S are mounted to short sideboards 314b, respectively. Peripheral surfaces of the light guide plate 319 opposite the respective LED boards 318L and 318S are light entrance surfaces 319b.

As illustrated in FIG. 18, the light reflection portions 328 are arranged such that an area distribution in a plane of a plate surface of the light guide plate 319 relative to the X-axis direction is as follows. The area distribution increases as a distance from the short-side LED board 318S increases. A point at which the area distribution becomes the maximum is at about the middle of the light guide plate 319 with respect to the X-axis direction. The area distribution of the light reflection portions 328 relative to the Y-axis direction is similar to the first embodiment.

Fifth Embodiment

A fifth embodiment of the technology will be described with reference to FIG. 19. The fifth embodiment includes a backlight 412 held in a different position from the first embodiment. The same configurations, functions, and effects as those in the first embodiment will not be described.

Figure 19:
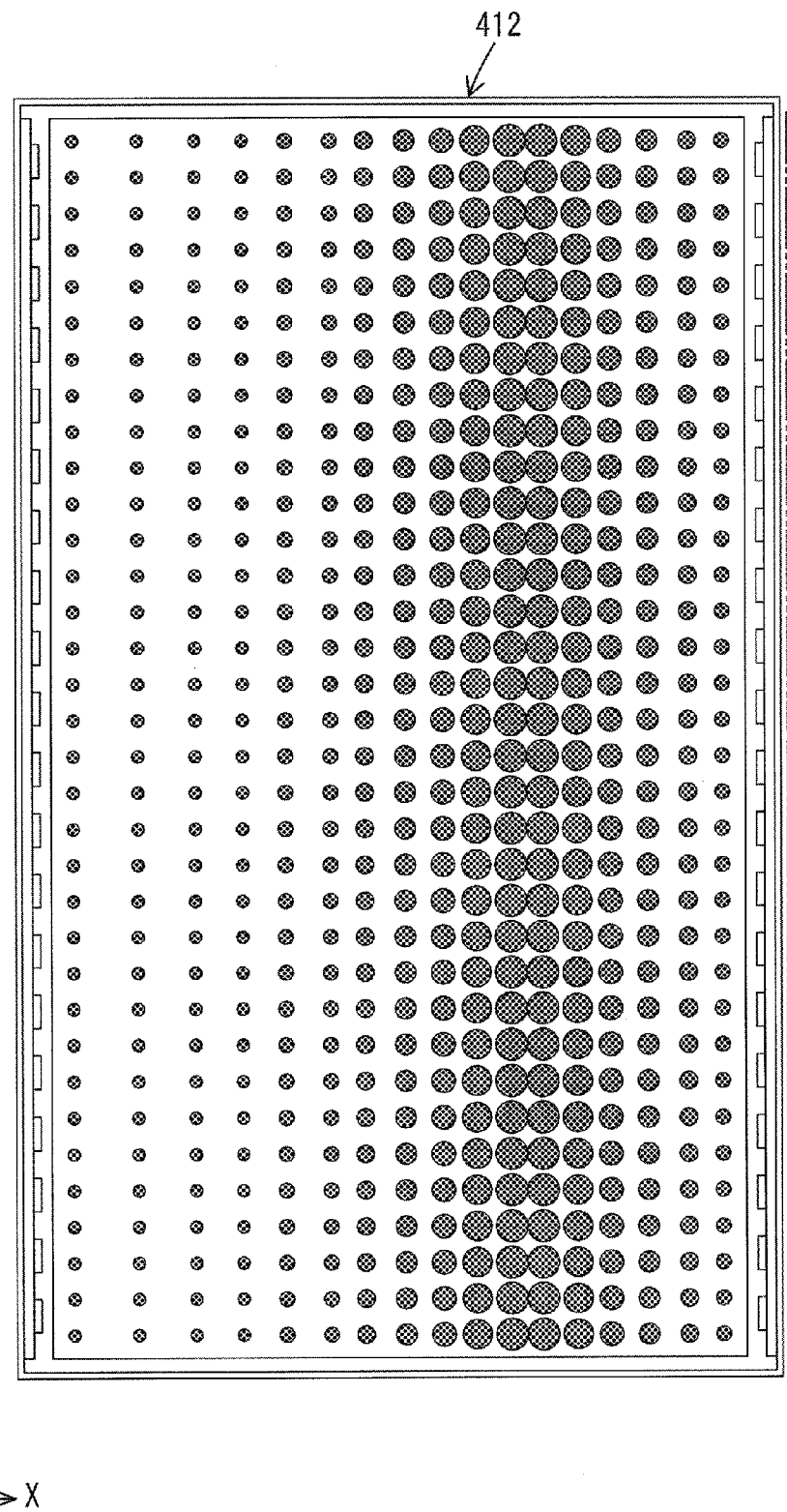
FIG. 19 is a plan view illustrating an arrangement of a chassis, a light guide plate, and an LED board according to a fifth embodiment of the technology.

As illustrated in FIG. 19, the backlight 412 in this embodiment is held in a position with long sides thereof along the Y-axis direction (vertical direction) and short sides thereof along the X-axis direction (horizontal direction). The backlight 412 and a liquid crystal display device used in such a position may be adapted to a digital signage or electronic blackboard.

Sixth Embodiment

A sixth embodiment of the technology will be described with reference to FIGS. 20 and 21. The sixth embodiment includes LED boards 518 arranged differently from the first embodiment. The same configurations, functions, and effects as those in the first embodiment will not be described.

Figure 20:
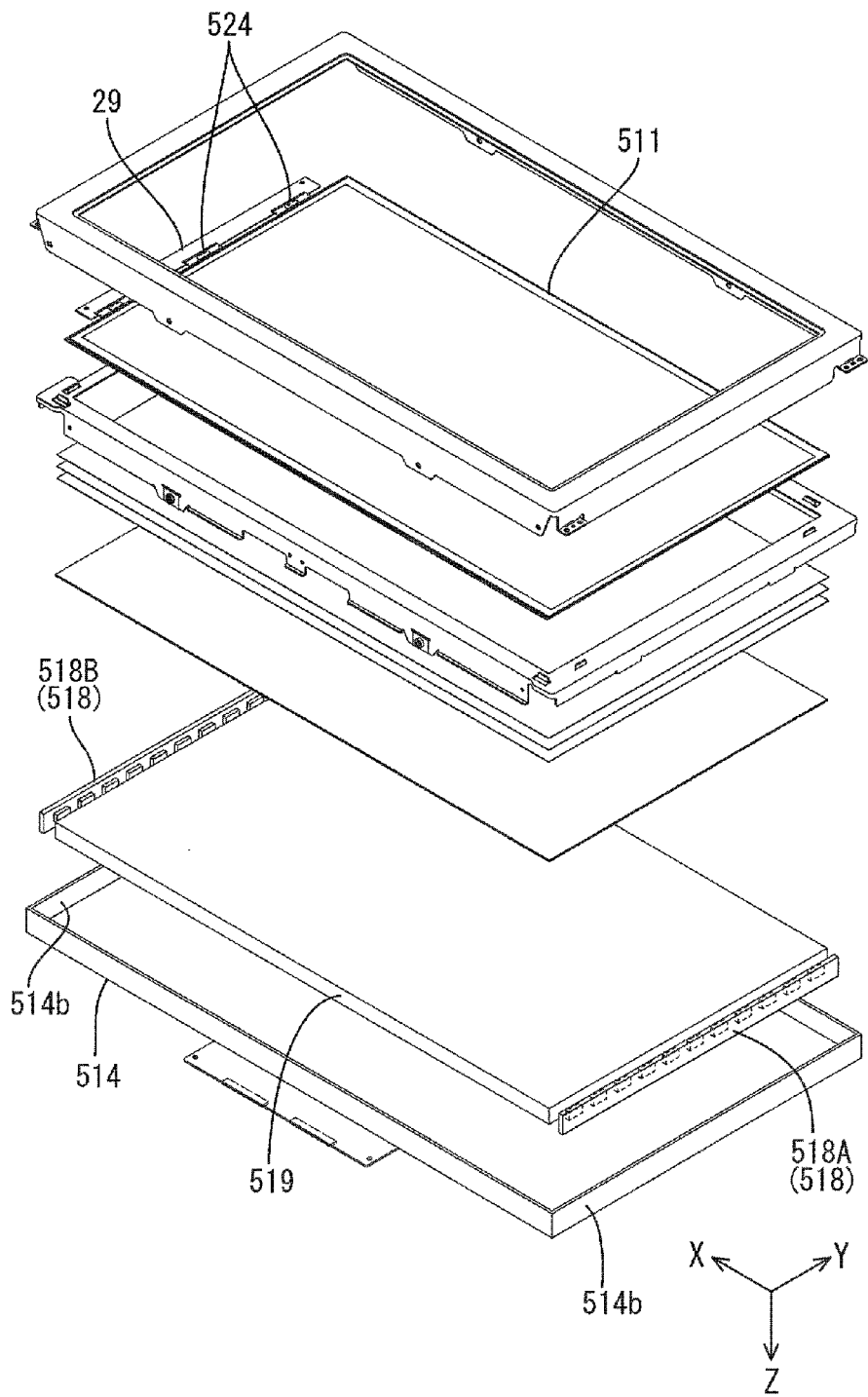
FIG. 20 is an exploded perspective view illustrating a general configuration of a liquid crystal display device according to a sixth embodiment of the technology.
Figure 21:
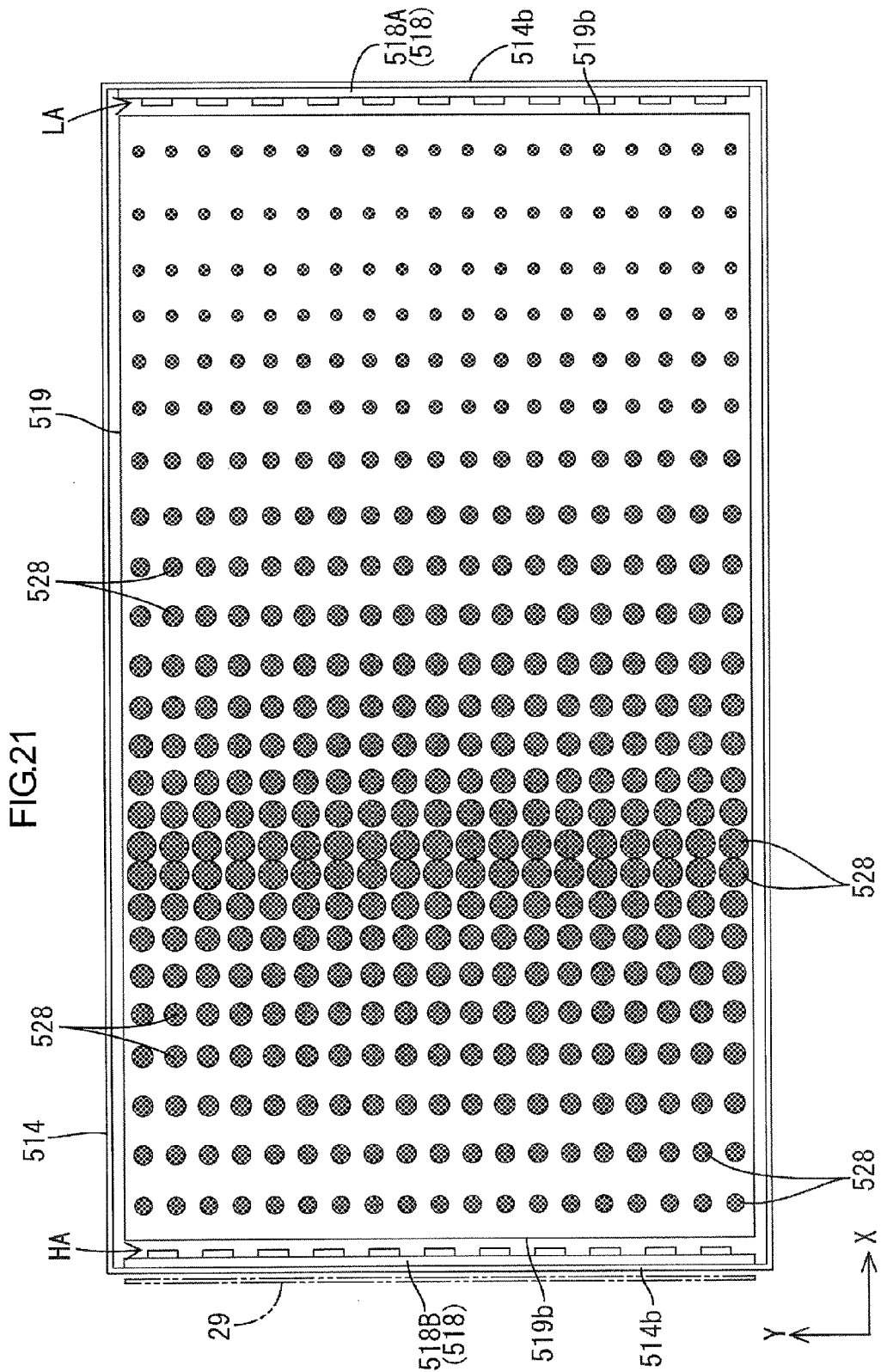
FIG. 21 is a plan view illustrating an arrangement of a chassis, a light guide plate, and an LED board.

As illustrated in FIGS. 20 and 21, the LED boards 518 in this embodiment extend in the short-side direction of the light guide plate 519. The LED boards 518 are arranged at positions such that the light guide plate 519 is sandwiched by the LED boards 518 with respect to the long-side direction (the X-axis direction). The LED boards 518 are attached to short side plates 514b of the 514, respectively. End surfaces of the light guide plate 519 on the short sides thereof are configured as light entrance surfaces 519b. Gate-side flexible circuit boards 524 connected to one of short ends of a liquid crystal panel 511 are connected to a printed circuit board 29. The printed circuit board 29 is connected to a control circuit board, which is not illustrated, and configured to relay signals. The gate flexible circuit boards 524 and the printed circuit board 29, which are heat sources, are arranged closer to one of the LED boards 518 on the left in FIGS. 20 and 21. The LED board 518 on the left in FIGS. 20 and 21 is arranged in a high temperature area HA in which a temperature tends to become higher than an area in which the LED board 518 on the right in FIGS. 20 and 21 is arranged (a low temperature area LA). The LED board 518 in the high temperature area HA is referred to as a second LED board 518B. The LED board 518 arranged in the low temperature area LA in which the temperature tends to become lower is referred to as a first LED board 518A. This embodiment does not include the source-side flexible circuit boards 23 and the printed circuit board 25 (see FIG. 3) in the first embodiment. The gate-side flexible circuit board 524 and the printed circuit board 29 have the same functions as those of the source-side flexible circuit boards 23 and the printed circuit board 25.

As illustrated in FIG. 21, light reflection portions 528 have an area distribution in a plane of a plate surface of the light guide plate 519 which varies in the X-axis direction. The area distribution increases as a distance from the first LED board 518A or the second LED board 518B increases and a point at which the area distribution becomes the maximum is located closer to the second LED board 518B.

Seventh Embodiment

A seventh embodiment of the technology will be described with reference to FIGS. 22 to 24. The same configurations, functions, and effects as those in the first embodiment will not be described.

As illustrated in FIG. 22, a television device TV according to this embodiment includes a liquid crystal display unit (a display unit) LDU, circuit boards PWB, MB, and CTB, a cover CV, and a stand ST. The circuit boards PWB, MB, and CTB are attached to the rear surface (the back surface) of the liquid crystal display unit LDU. The cover CV is attached to the rear surface of the liquid crystal display unit LDU so as to cover the circuit boards PWB, MB, and CTB. The liquid crystal display unit LDU is supported by the stand ST with a display surface thereof held along the vertical direction (the Y-axis direction). A liquid crystal display device 610 in this embodiment is a part of the above-described television device TV other at least than a part configured to receive television signals (e.g., a tuner section of a main circuit board MB). As illustrated in FIG. 23, the liquid crystal display unit LDU has a landscape rectangular overall shape (an elongated shape). The liquid crystal display unit LDU includes a liquid crystal panel 611 and a backlight 612 collectively held by a bezel 613 and a chassis 614, which are components of the liquid crystal display device 610 to form an exterior of the liquid crystal display device 610. The chassis 614 in this embodiment is one of the components to form the exterior and a part of the backlight 612.

As illustrated in FIGS. 23 and 24, the liquid crystal display unit LDU of the liquid crystal display device 610 is arranged in a space between the bezel (a front frame) 613 that forms a front exterior and the chassis (a rear chassis) 614 that forms a rear exterior. Major components arranged between the bezel 613 and the chassis 614 include at least the liquid crystal panel 611, an optical member 615, a light guide plate 619, and LED units (light source units) LU. The liquid crystal panel 611, the optical member 615, and the light guide plate 619 are layered directly onto each other and sandwiched between the bezel 613 on the front and the chassis 614 on the rear. The liquid crystal display device 610 in this embodiment does not include the frame 16 of the first embodiment arranged between the liquid crystal panel 11 and the optical member 15 (see FIGS. 2 and 3).

As illustrated in FIGS. 23 and 24, the backlight 612 includes the optical member 615, the light guide plate 619, the LED units LU, and the chassis 614, that is, a part of the liquid crystal display unit LDU other than the liquid panel 611 and the bezel 613. Four LED units LU are included in the backlight 612. Two pairs of the LED units LU are arranged such that the light guide plate 619 is sandwiched by each pair of the LED units LU with respect to the short-side direction (the Y-axis direction). Each two of the LED units LU are arranged in a line along the long-side direction of the light guide plate 619 (the X-axis direction). Each LED unit LU includes LEDs 617, an LED board 618 on which the LEDs 617 are mounted, and a heat dissipation member (a heat spreader, a light source mounting member) 30. Source-side flexible circuit board 623 and a printed circuit board 625 connected to one of long edges of the liquid crystal panel 611 are arranged closer to the LED board (the LED unit LU) 618 on the left in FIG. 24. The LED board 618 on the left in FIG. 24 is referred to as a second LED board 618B arranged in a high temperature area HA. The LED board 618 on the right in FIG. 24 is referred to as a first LED board 618A arranged in a low temperature area LA.

Other Embodiments

The technology is not limited to the above embodiments described in the above description and the drawings. For example, the following embodiments may be included in technical scopes of the technology.

(1) In the above embodiments, the LEDs mounted on the LED boards are driven with constant current by the LED drive circuit board. However, different method can be used for driving the LEDs. For example, the LEDs can be driven with pulse width modulation (PWM). The driving with the PWM is a method of driving the LEDs with modulated duty ratio (a time ratio of turn-on period to turn-off period) to periodically turn on and off the LEDs. In this case, the amounts of currents supplied to the LEDs are regulated to the same level but different time ratios of turn-on period to turn-off period are defined for the first LED board and the second LED board. Specifically, the turn-on period of the second LED board is set relatively short and the turn-on period of the first LED board is set relatively long. With this configuration, the current supplied to the second LED board per unit time (e.g., one cycle) is smaller than the current supplied to the first LED board per unit time.

(2) In the above embodiment, the dots of the light reflection portions have configurations in which the areas and the intervals alter according to distances from the LED boards. However, either the areas or the intervals may be altered.

(3) In the above embodiments, the dots of the light reflection portions are made of the same material. However, the dots of the light reflection portions may be made of different materials having different light reflective properties. In such a case, the areas and the intervals may be equalized.

(4) In the above embodiments, the dots of the light reflection portions have round shapes. However, the shapes of the dots are not limited to round shapes. For example, oval shapes, polygon shapes including triangle shapes and rectangular shapes may be used. Especially when the light reflection portions are formed through ink-jet printing, a large number of finer irregular dots may be dispersedly arranged.

(5) The arrangement patterns of the dots of the light reflection portions may be altered from those in the above embodiments. For example, the dots may be arranged in zigzag patterns (staggered patterns).

(6) In the above embodiments, the light reflection portions are formed by printing them on the surface of the light guide plate. However, the light reflection portions formed by different forming methods such as a metal deposition method may be included in the scope of the technology.

(7) In the above embodiments, the light reflection portions are formed by printing them on the surface of the light guide plate. However, the light reflection portions may be formed by denting portions of the plate surface of the light guide plate opposite from the light exiting surface into the form of groove. In this case, the light guide plate may be produced by injection molding.

(8) In the above embodiments, the light reflection portions are formed on the plate surface of the light guide plate opposite from the light exiting surface. However, the light reflection portions may be formed on the plate surface configured as the light exiting surface. Furthermore, the light reflection portions may be formed on the third reflection sheet.

(9) In the above embodiments, the area ratios of the light reflection portions are defined such that the area ratio at the first edge point is the minimum and smaller than the area ratio at the second edge point. However, the area ratio may be defined such that the area ratios at the first edge point and the second edge point are the same and the minimum. With this configuration, the light reflection portions can be easily designed.

(10) In the first, fourth, and sixth embodiments, the LED boards are arranged at the respective sides of a pair of sides or opposite all side. However, the LED boards may be arranged opposite three sides of the light guide plate.

(11) In the above embodiments, one LED board is arranged at one side of the light guide plate. However, two or more LED boards (i.e., multiple LED boards) may be arranged at one side of the light guide plate.

(12) In the above embodiments, the color portions of the color filtered in the liquid crystal panel are in three colors of R, G, and B. However, the color portions may be provided in four or more colors.

(13) In the above embodiments, the LEDs are used as light sources. However, other types of light sources such as organic ELs may be used.

(14) In the above embodiments, the TFTs are used as switching components of the liquid crystal display device. A liquid crystal display device including switching components other than TFTs (e.g., thin film diodes (TFDs)) may be included in the scope of the technology. A black-and-white liquid crystal display device other than the color liquid crystal display device may be included in the scope of the technology.

(15) In the above embodiments, the liquid crystal display device including the liquid crystal panel as a display panel is described. However, a display device including other type of display panel may be included in the scope of the technology.

(16) In the above embodiments, the television device including the tuner is described. However, a display device without a tuner may be included in the scope of the technology.

EXPLANATION OF SYMBOLS

10, 610: liquid crystal display device (display device), 11, 111, 511, 611: liquid crystal panel (display panel), 12, 112, 412, 612: backlight (lighting device), 14, 114, 214, 314, 514, 614: chassis, 17, 617: LED (unit light source), 18A, 118A, 218A, 318A, 518A, 618A: first LED board (first light source), 18B, 118B, 218B, 318B, 518B, 618B: second LED board (second light source), 19, 219, 319, 519, 619: light guide plate, 19a, 219a: light exiting surface (plate surface), 19b, 219b, 319b, 519b: light entrance surface (end surface), 19c: plate surface, 23, 623: source-side flexible printed circuit board (panel driver), 25, 225, 625: printed circuit board (panel driver), 26, 126, 226: LED drive circuit board (light source drive circuit board, light source driver), 26a: first LED drive circuit (light source driver), 26b: second LED drive circuit (light source driver), 27, 127, 227: control circuit board (panel drive control circuit board), 28, 128, 228, 328, 528: light reflecting portion, 28a: dot, 29: printed circuit board (panel driver), 524: gate-side flexible circuit board (panel driver), D1, D2: distance, d1, d2: distance, HA: high temperature area, I1, I2: current (amount of current), L1, L2: brightness (brightness level), TV: television device.

The invention claimed is:

1. A lighting device comprising:
a first light source;
a second light source opposed to the first light source and arranged in a high temperature area in which a temperature tends to become higher than an area in which the first light source is arranged;
a light guide plate arranged between the first light source and the second light source and configured such that rays of light from the first light source and the second light source enter through end surfaces opposite the first light source and the second light source, respectively, and exit through a plate surface on a light exiting side;
a light source driver configured to drive the first light source and the second light source to supply a smaller current to the second light source than a current supplied to the first light source; and
light reflection portions configured to reflect rays of light in the light guide plate to the light exiting side to increase rays of light exiting from the plate surface of the light guide plate on the light exiting side and arranged such that an area distribution in a plane of the plate surface of the light guide plate increases as a distance from corresponding one of the first light source and the second light source increases and takes a maximum value at a point closer to the second light source; wherein
a distance between the first light source and one of the end surfaces of the light guide plate is larger than a distance between the second light source and the other one of the end surfaces of the light guide plate.

2. The lighting device according to claim 1, wherein the first light source and the second light source include unit light sources arranged in a line along the end surfaces of the light guide plate, respectively, and a number and intervals of the unit light sources along one of the end surfaces are equal to those of the unit light sources along the other one of the end surfaces.

3. The lighting device according to claim 1, wherein the area of the light reflection portions in an edge area of the light guide plate closer to the first light source is smaller than the area of the light reflection portions in an edge area of the light guide plate closer to the second light source.

4. The lighting device according to claim 1, wherein the light reflection positions include a number of dots dispersedly arranged on a plate surface of the light guide plate opposite from the plate surface on the light exiting side.

5. The lighting device according to claim 1, wherein the light reflection portions are arranged such that a ratio of a distance from the point at which the area of the light reflection portions in the plane of the plate surface of the light guide plate is the maximum to the first light source to a distance from the point at which the area of the light reflection portions is the maximum to the second light source is about equal to a ratio of the current supplied to the first light source by the light source drive circuit to the current supplied to the second light source by the light source drive circuit.

6. The lighting device according to claim 1, wherein the light reflection portions area arranged such that a ratio of a distance from the point at which the area of the light reflection portions in the plane of the plate surface of the light guide plate is the maximum to the first light source to a distance from the point at which the area of the light reflection portions is the maximum to the second light source is about equal to a ratio of a brightness level of emitted light from the first light source to a brightness level of emitted light from the second light source.

7. The lighting device according to claim 1, further comprising:
a chassis holding the first light source, the second light source, and the light guide plate therein; and
a light source drive circuit board including a light source drive section, mounted to the chassis on an opposite side from the light exiting side, and arranged closer to the second light source.

8. A display device comprising:
the lighting device according to claim 1; and
a display panel configured to provide a display using light from the lighting device.

9. The display device according to claim 8, further comprising a panel driver connected to the display panel, configured to drive the display panel, and arranged closer to the second light source.

10. The display device according to claim 8, wherein
the lighting device comprises a chassis holding the first light source, the second light source, and the light guide plate therein, the display device,
the display device comprises:
a panel driver connected to the display panel and configured to drive the display panel; and
a panel drive control circuit board connected to the panel driver; wherein
the panel drive control circuit board is configured to control driving of the panel driver;

the panel drive control circuit board is mounted to the chassis on an opposite side from the light exiting side; and the panel drive control circuit board is arranged closer to the second light source.

11. The display device according to claim 8, wherein the display panel is a liquid crystal panel including a pair of substrates and liquid crystals sealed between the substrates.

12. A television device comprising the display device according to claim 8.

* * * * *